(12) United States Patent  (10) Patent No.: US 7,767,927 B2
Markle  (45) Date of Patent: Aug. 3, 2010

(54) METHODS AND APPARATUS FOR REMOTE TEMPERATURE MEASUREMENT OF A SPECULAR SURFACE

(75) Inventor: David A. Markle, Saratoga, CA (US)

(73) Assignee: Ultratech, Inc., San Jose, CA (US)

( * ) Notice: Subject to any disclaimer, the term of this patent is extended or adjusted under 35 U.S.C. 154(b) by 1388 days.

(21) Appl. No.: 11/129,971

(22) Filed: May 16, 2005

(65) Prior Publication Data

US 2006/0255017 A1 Nov. 16, 2006

(51) Int. Cl.
G01J 5/54 (2006.01)
B23K 26/00 (2006.01)

(52) U.S. Cl. .............................. 219/121.62; 219/121.83; 374/121; 374/130; 374/141

(58) Field of Classification Search ............ 219/121.61, 219/121.62, 121.65, 121.66, 121.83, 121.85; 356/43, 318, 327, 923; 374/53, 121, 130, 374/132, 141, 152
See application file for complete search history.

(56) References Cited

U.S. PATENT DOCUMENTS

| | | | | |
|---|---|---|---|---|
| 5,660,472 | A | 8/1997 | Peuse et al. | 374/128 |
| 5,755,511 | A | 5/1998 | Peuse et al. | 374/128 |
| 6,174,081 | B1 * | 1/2001 | Holm | 374/161 |
| 6,179,466 | B1 | 1/2001 | Peuse et al. | 374/128 |
| 6,201,609 | B1 * | 3/2001 | Hill et al. | 356/491 |
| 6,438,256 | B1 * | 8/2002 | Rubin et al. | 382/108 |
| 6,630,996 | B2 * | 10/2003 | Rao et al. | 356/237.5 |
| 6,666,857 | B2 * | 12/2003 | Smith | 606/12 |
| 6,747,245 | B2 | 6/2004 | Talwar et al. | 219/121.8 |
| 6,831,742 | B1 | 12/2004 | Sui et al. | 356/369 |
| 6,839,507 | B2 | 1/2005 | Adams et al. | 392/416 |
| 7,098,155 | B2 | 8/2006 | Talwar et al. | |
| 7,148,159 | B2 | 12/2006 | Talwar et al. | |
| 7,154,066 | B2 | 12/2006 | Talwar et al. | |
| 7,155,363 | B1 * | 12/2006 | Rosenthal et al. | 702/135 |
| 7,157,660 | B2 | 1/2007 | Talwar et al. | |
| 7,502,151 | B2 * | 3/2009 | Toishi et al. | 359/3 |
| 2004/0000627 | A1 * | 1/2004 | Schuster | 250/201.2 |

(Continued)

FOREIGN PATENT DOCUMENTS

JP 402223832 A * 9/1990

(Continued)

*Primary Examiner*—Samuel M Heinrich
(74) *Attorney, Agent, or Firm*—Allston L. Jones; Peters Verny, LLP

(57) ABSTRACT

Methods and apparatus for remotely measuring temperature of a specular surface. Method takes two measurements of P-polarized radiation emitted at or near Brewster angle from the surface. First measurement (SA) collects and detects first amount of radiation emitted directly from a surface portion using a collection optical system. Second measurement (SB) includes first amount of radiation and adds quantity of radiation collected at or near at/near Brewster angle and reflected from the surface with a retro optical system with a round-trip transmission $t_2$ that retro-reflects a quantity of radiation received from surface portion back to same surface portion where it reflects and combines with first amount of radiation collected by collection optical system. Measurements SA and SB and $t_2$ are used to determine surface emissivity ($\xi$). Calibration curve is used that relates ratio of the first measurement SA to surface emissivity (SA/$\xi$), to surface temperature. Surface temperature determined from SA/$\xi$ by calibration curve.

6 Claims, 18 Drawing Sheets

U.S. PATENT DOCUMENTS

| | | |
|---|---|---|
| 2004/0173585 A1 | 9/2004 | Talwar et al. |
| 2004/0188396 A1 | 9/2004 | Talwar et al. |
| 2005/0067384 A1 | 3/2005 | Talwar et al. |
| 2005/0103998 A1 | 5/2005 | Talwar et al. |
| 2005/0189329 A1* | 9/2005 | Talwar et al. .......... 219/121.65 |
| 2006/0145365 A1* | 7/2006 | Halls et al. ........... 257/E51.022 |

FOREIGN PATENT DOCUMENTS

| | | |
|---|---|---|
| JP | 403082017 A * | 4/1991 |

* cited by examiner

METHODS AND APPARATUS FOR REMOTE TEMPERATURE MEASUREMENT OF A SPECULAR SURFACE

CROSS-REFERENCE TO RELATED APPLICATIONS

The present invention is related to the following patents and patent applications: U.S. Pat. No. 6,747,245 (the '245 patent), entitled "Laser Scanning Apparatus and Method for Thermal Processing"; U.S. patent application Ser. No. 10/787,664, entitled "Laser Scanning Apparatus and Methods for Thermal Processing", filed on Feb. 26, 2004 and issued as U.S. Pat. No. 7,154,066 on Dec. 26, 2006; U.S. patent application Ser. No. 10/806,014, entitled "Laser Scanning Apparatus and Methods for Thermal Processing", filed on Mar. 22, 2004, and published as U.S. Patent Application Serial No. 2004/0173585 on Sep. 9, 2004 and issued as U.S. Pat. No. 7,157,660 on Jan. 2, 2007; U.S. patent application Ser. No. 10/674,106, entitled "Method of Annealing Undoped Silicon Substrates", filed on Sep. 29, 2003 and issued as U.S. Pat. No. 7,148,159 on Dec. 12, 2006; and U.S. patent application Ser. No. 10/762,861, entitled "Laser Thermal Annealing of Lightly Doped Silicon Substrates," filed on Jan. 22, 2004 and issued as U.S. Pat. No. 7,098,155 on Aug. 29, 2006, all of which are assigned to the common Assignee Ultratech, Inc. of San Jose, Calif., and all of which are incorporated by reference herein.

BACKGROUND OF THE INVENTION

1. Field of the Invention

The present invention relates to apparatus for and methods of remotely measuring the temperature of a specular surface, and has particular utility in the field of laser thermal processing (LTP) where a beam of radiation is scanned across a substrate surface to heat the surface, and has general utility to thermal processing where the temperature of a specular surface needs to be known to a relatively high degree of accuracy and precision.

2. Description of the Prior Art

LTP is a technique for manufacturing semiconductor devices such as integrated circuits or "ICs". LTP involves irradiating a substrate, such as a doped semiconductor wafer, to rapidly bring the substrate surface from a relatively low temperature (e.g., 400° C.) to a relatively high temperature (e.g., 1,300° C.) quickly so that the substrate bulk can pull the temperature down quickly. Such a rapid thermal cycle might be used, for example, to efficiently activate dopants in the substrate because only the material very close to the top surface of the substrate is heated to the relatively high temperature during irradiation.

As described in U.S. Pat. No. 6,747,245, one approach to LTP involves scanning a long, narrow laser beam back and forth across the wafer surface in a raster pattern. The amount of time the laser beam resides over a given point on the wafer surface is called the "dwell time". Using this scanning approach, it is possible to achieve peak surface temperatures near 1350° C. with dwell times in the millisecond range. The result is a rapid thermal annealing of doped wafers that yields high activation levels with very little dopant diffusion. When used to fabricate transistor-based circuits, transistors with a sharply defined dopant profile and with a small sheet resistance are formed. LTP is capable of providing significantly lower sheet resistance values than possible using so-called Rapid Thermal Processing (RTP), which has dwell times equivalent to several seconds.

While the LTP process is quick and effective, the results are sensitive to the peak temperature produced on the substrate surface. A difference in the peak annealing temperature of as little as a 5° C. can result in a measurable and undesirable difference in sheet resistance.

Accordingly, it would be advantageous to be able to measure the substrate surface temperature during LTP. Because of the rapid heating and cooling cycle associated with LTP, and because of the scanning geometry, in practice the peak surface temperature is best measured remotely. The most robust prior-art remote surface-temperature measurement techniques require making measurements of emitted radiation made at a number of different wavelengths. The ratios of these measurements are used to make a number of different temperature estimates. These estimates are then weighted and combined to reach a final estimated temperature. Unfortunately, this approach is relatively complex and not sufficiently accurate for the range of temperatures and the variations in surface emissivity associated with LTP.

SUMMARY OF THE INVENTION

An aspect of the invention is a method of measuring a surface temperature of a specular surface. The method includes measuring at or near the Brewster angle of the surface a first amount of P-polarized radiation emitted from a portion of the surface. The method also includes measuring a second amount of P-polarized radiation. The second amount consists of the first amount plus a quantity of P-polarized radiation collected from the surface portion at or near the Brewster angle and retro-reflected from the same surface portion. The method further includes determining an emissivity $\xi$ of the surface portion from the first and second amounts of P-polarized radiation, and establishing a relationship (e.g., a calibration curve) between temperatures of a black body and a ratio of the first amount of P-polarized radiation to the surface emissivity $\xi$. The relationship is then used to establish the surface temperature based on the first amount of P-polarized radiation and the emissivity $\xi$.

Another aspect of the invention is a system for remotely measuring a temperature of a specular surface of an object. The system includes a collection optical system having a photodetector. The system is arranged to receive and detect P-polarized radiation emitted from a portion of the surface at or near the Brewster angle and form therefrom a first signal SA. The temperature measuring system further includes a retro optical system with a round-trip transmission $t_2$ ($t_2$ has no units—it is a ration between 0 and 1 that represents the round trip transmission of the recycling system). The retro optical system is arranged to receive P-polarized radiation emitted from the surface portion at or near the Brewster angle and retro-reflect the received P-polarized radiation to the collection optical system via reflection from the surface portion to cause the photodetector to form a second signal SB. The temperature measuring system also includes a controller. The controller is coupled to the detector to receive and process signals SA and SB and is adapted to calculate the surface emissivity via the relation $\xi = 1-(SB/SA-1)/t_2$. The controller also includes calibration data that relates a ratio $SA/\xi$ to temperature, and that is adapted to determine the surface temperature, TS, from signal SA and emissivity $\xi$.

Another aspect of the invention is the temperature measuring system as described immediately above, wherein the photodetector includes an array of pixels that map to the surface portion. The controller is adapted to calculate a surface temperature corresponding to each pixel so as to create a surface temperature map of the surface portion. The temperature map can be used for a number of applications. One application is determining a spacing between scan paths for a scanning system that uses a scanned radiation beam to heat the surface of the wafer. Another application is controlling the amount of power delivered to a surface by a radiation source to control the surface temperature.

A further aspect of the invention includes controlling the distribution of radiation in the scanned radiation beam to obtain a broad region of uniform maximum temperature in the beam path across the substrate.

These and other aspects of the invention are described in detail below.

Figure 1:
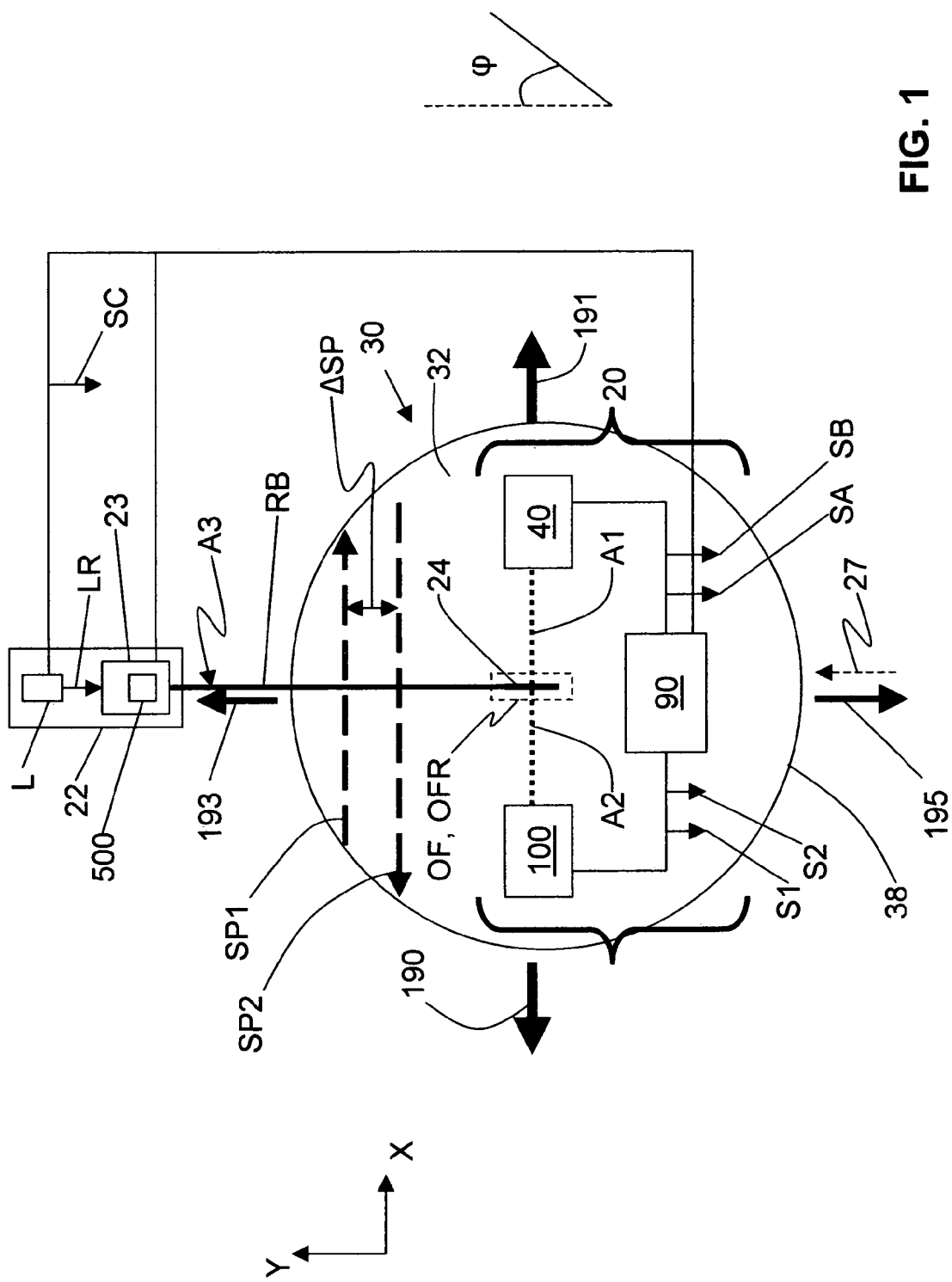
FIG. 1 is a plan view of an example embodiment of the surface-temperature measurement system of the present invention shown in relationship to a semiconductor wafer with a specular surface, and in relation to an LTP system that irradiates the wafer surface by generating an LTP laser beam that forms a line image at the wafer surface.

The various elements depicted in the drawings are merely representational and are not necessarily drawn to scale. Certain proportions thereof may be exaggerated, while others may be minimized. The drawings are intended to illustrate various implementations of the invention, which can be understood and appropriately carried out by those of ordinary skill in the art.

DETAILED DESCRIPTION OF THE INVENTION

The present invention relates to apparatus for and methods of remotely measuring the temperature of a specular surface and has particularly utility in the field of laser thermal processing (LTP). Here, a "specular surface" means a surface that is either entirely or substantially flat and reflecting, as opposed to one that is substantially rough and scattering. These criteria depend on the wavelengths and angles used to measure the properties of the surface.

A preferred embodiment of the invention utilizes relatively high angles of incidence and wavelengths that are long compared to the surface undulations on the substrate. This choice of variables renders the surface more specular-like and less diffuse-like or scattering-like than it would be at shorter wavelengths and smaller (e.g., normal or near-normal) incident angles. In the example embodiments discussed below, the substrate is a silicon wafer undergoing LTP. However, the present invention is not limited to a substrate-type object, or to an LTP process.

In the discussion below, the "Brewster angle" is used to refer to the angle of minimum or near-minimum reflectivity of P-polarized light from a surface. Strictly speaking, films on the surface of an object, such as silicon wafer, prevent it from having a true Brewster angle, for which the reflectivity would be zero if the silicon is not doped. Accordingly, the Brewster angle as used herein for a specular surface formed from a variety of different films stacked on a substrate can be thought of as an effective Brewster angle, or the angle at which the reflectivity of P-polarized radiation is at a minimum. This minimum angle typically coincides with or is near the angle of the true Brewster angle for the substrate.

FIG. 1 is a plan view of an example embodiment of a surface temperature measurement system 20, shown in relationship to (i.e., above) an object 30 in the form of a semiconductor substrate ("wafer"). The azimuthal angle is defined in this view and is indicated by angle φ. The X and Y axes are also shown for reference. Also shown in FIG. 1 is an LTP optical system 22 having an optical axis A3 at an azimuth angle of zero. LTP optical system 22 includes along optical axis A3 a radiation source L and a downstream beam-forming optical system 23. Beam-forming optical system 23 forms an LTP radiation beam RB from radiation LR emitted by radiation source L. In an example embodiment, beam-forming optical system 23 includes a beam-adjusting apparatus 500 for adjusting the amount of energy (power) in radiation beam RB. Beam-adjusting apparatus 500 is discussed in greater detail below.

In an example embodiment, radiation source L is a $CO_2$ laser and radiation LR has a wavelength of 10.6 microns. LTP radiation beam RB forms an image 24, such as a line image, on wafer 30 at wafer surface 32. Line image 24 heats the wafer surface as the wafer is scanned at right angles to the long direction of the line image, thus performing LTP of the wafer.

Figure 2:
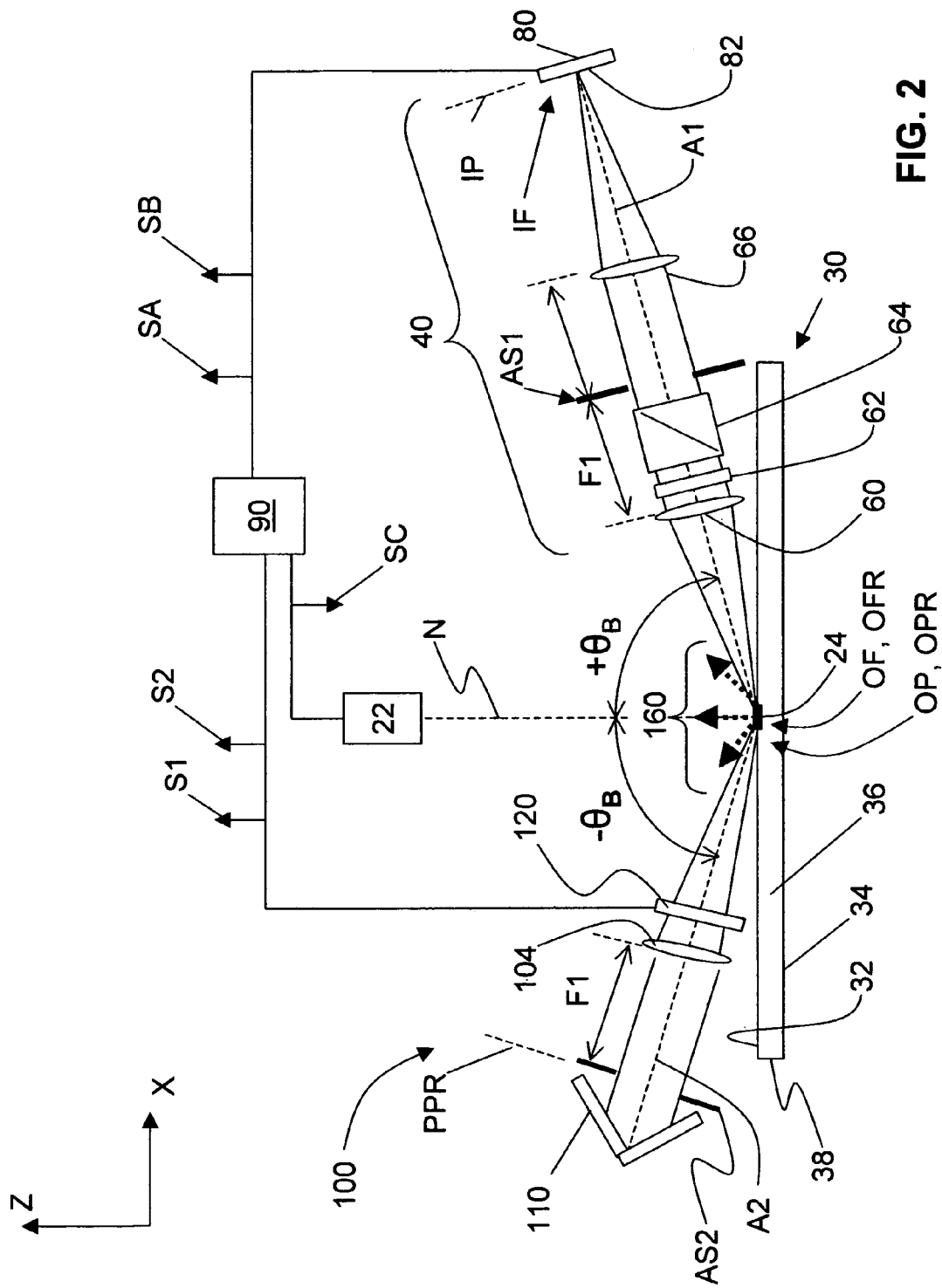
FIG. 2 is a schematic side view of the apparatus shown in FIG. 1.

FIG. 2 is a schematic side view of system 20 as viewed in the Y-direction as indicated by arrow 27 in FIG. 1. The incident angle is indicated by θ, which is measured relative to the normal N to surface 32. For ease of illustration, LTP radiation beam RB is omitted from FIG. 2. Besides a specular upper surface 32, wafer 30 also includes a lower surface 34, a body portion 36, and an outer edge 38.

The Collection Optical System

With reference to FIGS. 1 and 2, measurement system 20 includes a collection optical system 40 having an optical axis A1. Optical axis A1 is arranged at an angle $+\theta_B$ relative to surface normal N, wherein $\theta_B$ denotes approximately the incident angle of minimum reflectivity for P-polarized radiation (FIG. 2). In an example embodiment, collection optical system 40 includes, in order along optical axis A1 away from the wafer, a collection lens 60, an optical filter 62, a P-polarizer 64 oriented to transmit the P-polarization component of radiation from the substrate, an aperture stop AS1, a focusing lens 66, and a photodetector 80 that has a photodetector surface 82. In an example embodiment, lenses 60 and 66 each have a focal length F1, and aperture stop AS1 is located a distance F1 from lens 60 and from lens 66.

Photodetector 80 is operably coupled to a controller 90. In an example embodiment, controller 90 is or includes a microprocessor, a field-programmable gate array (FPGA) and/or other logic device(s) adapted to carry out logic and control operations. In an example embodiment, controller 90 is a computer. Controller 90 is adapted to control the operation of system 20 and process information received from photodetector 80 according to the methods described below.

The transmissive elements of collection optical system 40 are adapted to transmit infrared (IR) or visible light. In an example embodiment, collection lens 60, optical filter 62 and P-polarizer 64 are made from IR-transmitting materials such as fused silica, LaSF 9 glass, calcium fluoride, silicon, etc. In an example embodiment, optical filter 62 has a spectral bandwidth of about 0.2 microns centered on a wavelength of about 1.6 microns, which corresponds to the long-wavelength detection limit of InGaAs.

Figure 3:
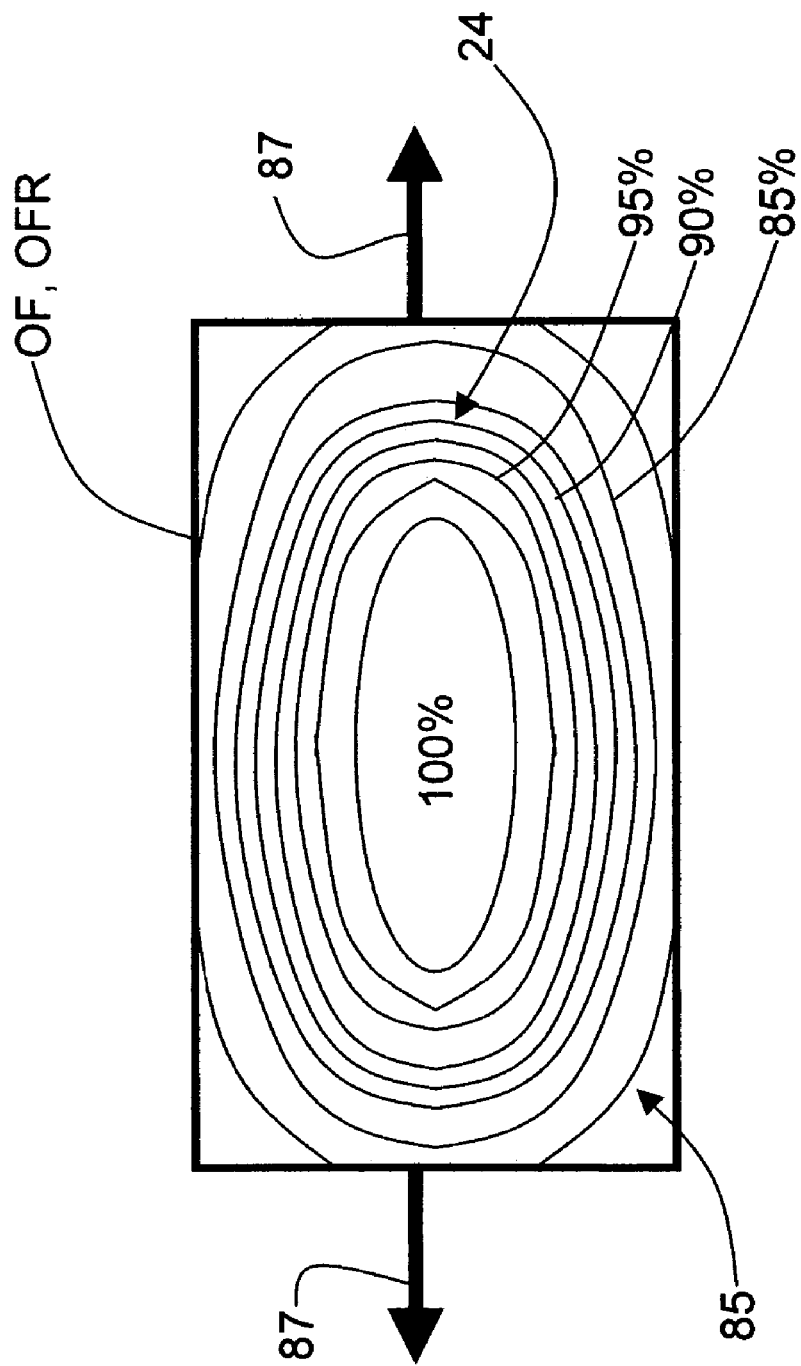
FIG. 3 is a plan view of the object fields (OF, OFR) for the collection optical system and the retro optical system showing a portion of the line image as intensity contours within the object fields.

Collection optical system 40 has an object field OF located in an object plane OP, and a corresponding image field IF located in an image plane IP. Object plane OP is in the plane of wafer surface 32. FIG. 3 is a schematic plan diagram of a rectangular object field OF of collection optical system 40. Line image 24 is represented in object field OF by intensity contours 85 that represent a percentage of the maximum line image intensity. In an example embodiment, object field OF is formed so as to include a central portion of line image 24, e.g., out to at least the 85% intensity contour in the long direction of the image. Arrows 87 indicated the long direction of line image 24, which extends beyond the left and right sides of the object field. In the short direction of the image, object field OF could extend over several millimeters of the wafer surface and include the wafer surface prior to, during, and after heating by the laser. Thus, the intensity contours in this direction could extend from the wafer ambient temperature to the peak temperature and well into the area where the surface temperature is in rapid decline.

Figure 4:
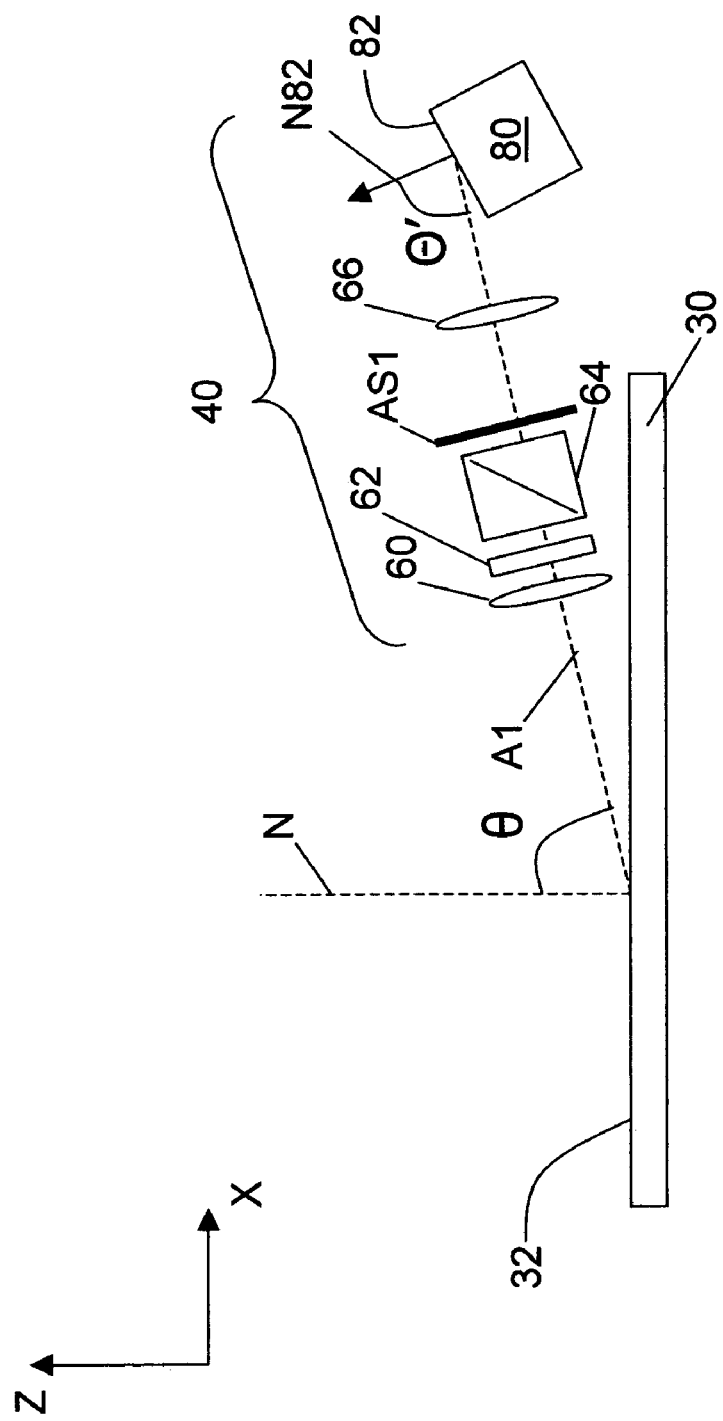
FIG. 4 is a close-up view of the collection optical system of FIG. 1, illustrating an example embodiment wherein the photodetector surface is angled with respect to the collection optical system axis (A1) to account for the angled object field (OF) that lies in the plane of the substrate surface.

With reference again to FIG. 2, photodetector 80 is arranged at image plane IP to detect the intensity in the corresponding image field IF. In an example embodiment illustrated in the close-up diagram of FIG. 4, photodetector 80 is tilted to accommodate the tilted object plane OP and tilted object field OF, which lie in the plane of wafer surface 32. In FIG. 4, if the magnification of collection optical system 40 is unity, then θ=θ', wherein N82 is the surface normal to photodetector surface 82 and θ' is the angle between axis A1 and surface normal N82.

In an example embodiment, photodetector 80 is a single-element photodetector positioned to observe the highest temperature on surface 32. In another example embodiment, photodetector 80 is a two-dimensional detector array that is sensitive to infrared light, such as an indium-gallium-arsenide (InGaAs) photodetector array. Additional benefits of using a photodetector array include their ready availability, and the close match between the long-wavelength-detection limit and the wavelength emission peak generated by the temperatures one would expect to measure during thermal processing of an IC wafer. An example photodetector 80 in the form of an array is ALPHA NIR sensor head available from Indigo, Inc., Santa Barbara, Calif. The ALPHA NIR sensor head contains a 320 by 256 array of InGaAs pixels that can operate anywhere in a spectral band extending from 900 nm to 1700 nm. Another example photodetector 80 is a silicon CMOS photodetector, such as the KAC-9630 made by Kodak Corp., Rochester, N.Y., which is capable of capturing images at 580 frames per second. The architecture of a CMOS photodetector array permits a tradeoff between the number of photodetector elements (pixels) interrogated and the frequency of interrogation. In this application, the regions of highest temperature are of most interest, and these occupy only a very thin band across the center of the detector array. Thus, the data of prime interest can be obtained by interrogating a relatively small number of pixels.

In an example embodiment, photodetector 80 is sized to detect an image field IF that is the image of object field OF. Thus, the area surrounding the hottest region of wafer surface 32 is imaged onto photodetector 80 so that the surface temperature distribution can be mapped and the highest temperature found. From examining the temperature distribution map, the peak surface temperature on wafer surface 32 within object field OF can be found, and the width and position of the region in image 24 having an intensity falling within some percentage of the peak temperature (e.g., 99% to 100%) can be found. This information can be used, in turn, to establish a spacing ΔSP between adjacent scan paths SP1 and SP2 when scanning image 24 over wafer surface 32, e.g., by scanning the wafer back and forth in the X-direction relative to image 24, as indicated by arrows 190 and 191 (FIG. 1). Between scans, the wafer is shifted in the Y direction, as indicated by arrows 193 and 195.

If temperature mapping of an extended image 24 is called for, then it is desirable to employ telecentric optical systems for collection optical system 40 and for the retro optical system 100 (introduced below). Such an arrangement ensures that each object point in object field OF is imaged with the same numerical aperture, incident angle θ and azimuth angle φ.

The Retro Optical System

With reference again to FIGS. 1 and 2, system 20 further includes a polarization-preserving, retro-reflecting optical system 100 ("the retro optical system") having an optical axis A2 and a two-way transmission $t_2$. Retro optical system 100 has an object field OFR that coincides with object field OF of collection optical system 40, as indicated in FIGS. 1 and 2. The retro optical system illustrated in FIG. 2 employs a collection lens 104 and a pupil stop AS2 located one focal length F1 away from lens 104 in the pupil plane PPR, rendering the retro optical system telecentric. Retro optical system 100 also includes a polarization-preserving retro-reflecting mirror 110 adjacent pupil stop AS2 opposite lens 104.

Figure 5:
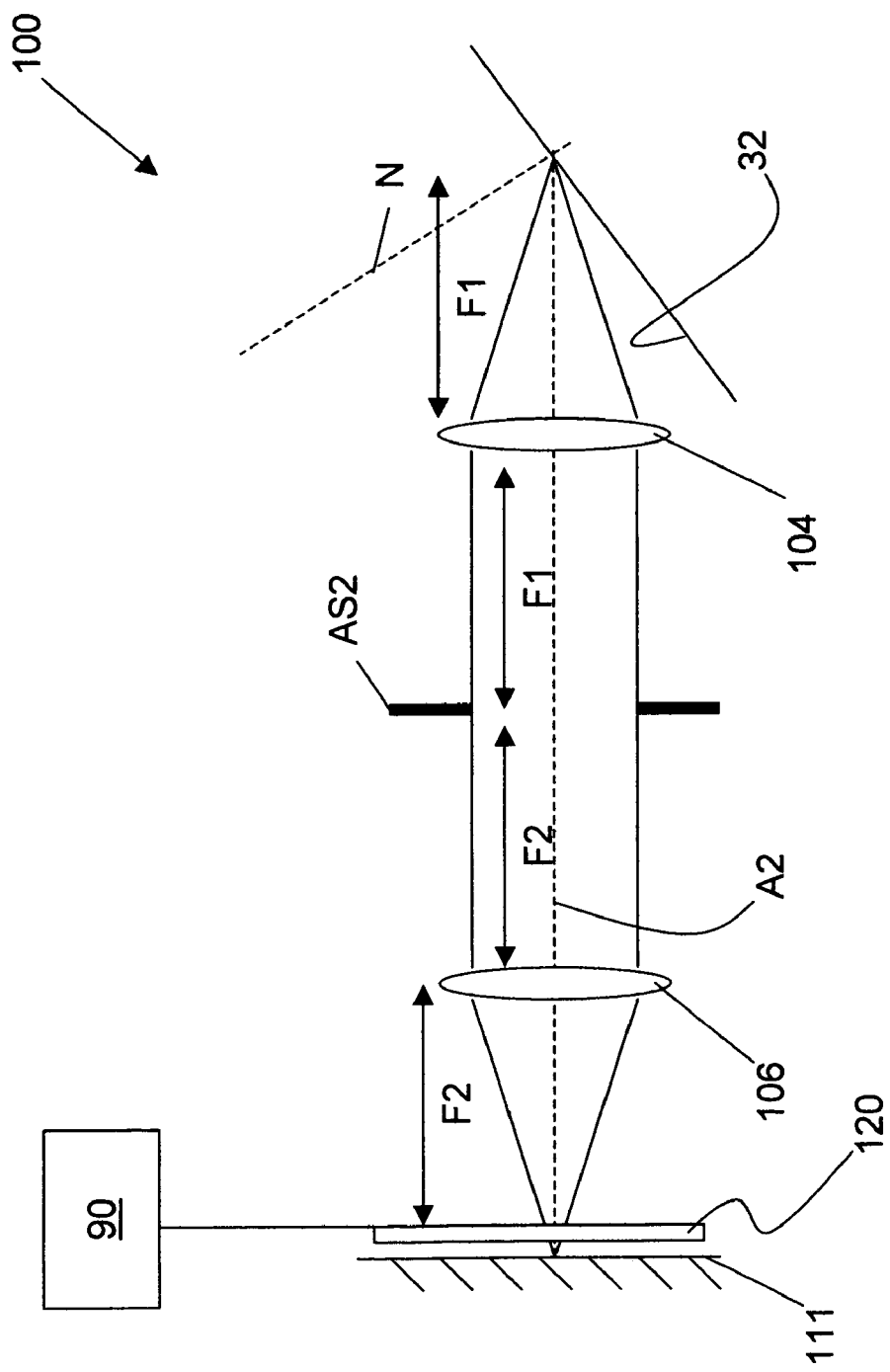
FIG. 5 is a schematic side-view of an alternative embodiment of the retro optical system in the form of a "4F relay"

In an alternate example embodiment, illustrated in FIG. 5, a retro optical system 100 includes along optical axis A2 a collimating lens 104 and aperture stop AS2 located one focal length F1 away from the collimating lens to make the retro optical system telecentric. Aperture stop AS2 defines a pupil plane PPR. This system, which is a form of a so-called "4F relay," has another collimating lens 106 one focal length F2 away from the aperture stop, and a plane mirror 111 (or grating) one focal length F2 away from lens 106. Collection optical system 40 could also be a 4F design to assure telecentricity while also maintaining exactly the same collection geometry over the field of view.

With reference again to FIG. 2, in an example embodiment, retro optical system 100 includes an on-off modulator (shutter) 120 operably coupled to controller 90 and adapted to allow or prevent light from entering and/or leaving the retro optical system. In retro optical system 100 of FIG. 5, shutter 120 is arranged adjacent a plane mirror 111. In retro optical system 100 of FIG. 2, shutter 120 is arranged along optical axis A2 between wafer surface 32 and collimating lens 104. In an example embodiment, shutter 120 is a rotating aperture wheel or chopper adapted to block the radiation from every point along the line image simultaneously. In another example embodiment, shutter 120 is an electro-optical shutter. Optical shutter 120 is preferably capable of providing on-off modulation at a rate of 1 kHz or faster. Retro optical system 100 is arranged to cover the same range of incidence angles as optical system 40 relative to surface normal N, and is centered in the same plane as optical axis A1 (FIG. 1) and surface normal N (FIG. 2). The object field OFR covered by retro optical system 100 is large enough to cover at least the same area as viewed by the photodetector 80 (i.e., object field OF), and in an example embodiment covers a slightly greater area. Likewise, the numerical aperture of retro optical system 100 is at least the same as that of collection optical system 40, and in an example embodiment is slightly greater. In an example embodiment, object fields OF and OFR are the same size and overlap completely so that collection optical system 40 and retro optical system 100 view the same portion of wafer surface 32.

In operation, radiation 160 (FIG. 2) emitted from wafer surface 32 and collected by retro optical system 100 is retroreflected by retro-reflecting mirror 110 (e.g., a polarization preserving corner cube mirror) and imaged back onto the wafer surface at the location where the light was originally emitted, i.e., object field OFR.

Method of Operation

If the emissivity of a surface is known, a remote surface temperature measurement can be obtained by measuring the photon flux (photons per unit area per second) emitted from the surface and dividing this measurement by the emissivity to derive an equivalent black-body flux measurement. The equivalent measurement can then be used with a previously derived relationship, such as a calibration curve, that relates a detected signal level to the temperature of an ideal black body. The emissivity of a substrate surface such as a semiconductor wafer, however, is typically not known with much accuracy and may change from point-to-point across the substrate. Therefore, assuming a surface emissivity value for an IC process wafer leads to inaccurate temperature estimates. Greater accuracy can achieved by actually measuring the surface emissivity and then using the ratio of the measured photon flux to emissivity ratio to determine the surface temperature TS.

For a specular surface, the surface emissivity ξ is related to the surface reflectivity r by the relationship:

$$\xi = 1 - r \qquad (1)$$

The reflectivity r is minimal for a substrate, such as a silicon wafer, for incidence angles at or close to the Brewster angle for P-polarized radiation. This remains true even with the presence of other film stacks such as those used to form transistor elements, although the reflectivity minimum may not approach zero as closely with a patterned substrate as for an unpatterned substrate. Thus by measuring the P-polarized radiation emitted at the incidence angle corresponding the minimum reflectivity, and assuming the substrate is a black body, it is possible to get a reasonably accurate temperature measurement.

By collecting with the retro optical system the radiation emitted from the wafer surface in the opposite azimuth direction at the same incidence angle, and returning this radiation back onto the substrate, where it can reflect into the collection optical system, it is possible to improve the accuracy of the substrate temperature measurement as compared to the measurement that simply relies only on directly emitted radiation. In this case, it is necessary that the retro optical system preserve the polarization direction of the P-polarized radiation that is recycled back to the substrate.

Assuming 100% recycling efficiency (transmission $t_2$) from retro optical system 100, the effective emissivity ξ' would be:

$$\xi' = \xi + \xi(1-\xi)$$

Thus, if ξ=0.9, then ξ'=0.9+0.9(1−0.9)=0.99, which is much closer to the ideal value of unity.

The '245 patent teaches that the coupling between LTP radiation and the wafer is maximized when the LTP radiation is P-polarized and is incident on wafer surface 32 at or near an incident angle θ approximately equal to the Brewster angle $\theta_B$ for the substrate material. The Brewster angle for bare silicon is about 75°, at which angle the reflectivity r=0 for P-polarized radiation. However, for a silicon wafer having a variety of thin film stacks distributed over the surface, which is the case for an IC process wafer, there is no Brewster angle per se, and thus no angle where the reflectivity is zero. For film stacks likely to be found on an IC process wafer, a lower reflectivity for P-polarized radiation is generally achieved at or near the Brewster angle that corresponds to the bare silicon substrate, however minimum reflectivities higher than 25% (r=0.25) are possible with some film combinations.

System 20 of the present invention allows two measurements of the radiation (photon flux) 160 emitted from wafer surface 32 to be made at or near the angle of minimum reflectivity. The two measurements are then used to determine the surface emissivity ξ and the wafer surface temperature TS.

As mentioned above, LTP optical system 22 generates a radiation beam RB that forms line image 24 on wafer surface 32. In thermally processing wafer surface 32, line image 24 is raster-scanned over wafer surface 32 over scan paths SP1, SP2, etc., e.g., by moving wafer 30 in the X-direction relative to the line image, as indicated by arrows 190 and 191 in FIG. 1, so that the line image is scanned back and forth over the wafer. Note that arrows 193 and 195 indicate shifts in either +Y- or −Y-direction between scans to displace the scan paths relative to one another. In an example embodiment, line image 24 is quite narrow so the temperature of a point on the substrate goes from ambient to the maximum annealing temperature in the short time it takes to scan the wafer a distance corresponding to the narrow line image width.

Measurement system 20 is arranged so that respective axes A1 and A2 of collection optical system 40 and retro optical system 100 intersect the substrate surface 32 at line image 24 so that object fields OF and OFR overlap (FIG. 1). As line image 24 is scanned over wafer surface 32 and heats the surface, radiation 160 is emitted from the heated surface. This emitted radiation, when properly collected by collection optical system 40, measured by photodetector 80 and the measurements processed by controller 90 as described below, can be used to determine the temperature TS of the particular portion of wafer surface 32 being irradiated by the line image.

As discussed above, if photodetector 80 is a detector array, the pixels 234 (see FIG. 7) in the array map to object field OF via collection optical system 40. Thus, the temperature distribution over the object field OF can be mapped, and the peak temperature on the substrate can be determined. Also, the temperature map allows conclusions to be drawn about the distance over which acceptable maximum temperature uniformity is maintained and the position of this region of good uniformity. In an example embodiment, these parameters are used to determine the state of operation of the system, and to generate fault conditions to limit system operation if the system is not operating in an acceptable state.

At the other extreme, if photodetector 80 is not an array, then it is necessary to ensure that this photodetector views the position of the substrate where the highest maximum temperature occurs or is likely to occur. Though the single-element detector is easier to implement, it does not suffice for determining the temperature uniformity With continuing reference to FIGS. 1 and 2, once the scanning of line image 24 is initiated, controller 90 sends a signal S1 to shutter 120 that causes the modulator to block the optical path to prevent radiation emitted from the wafer surface from entering or leaving retro optical system 100. Meanwhile, collection optical system 40 collects radiation (photons) 160 emitted from the heated portion of wafer surface 32 encompassed by object field OF. Object field OF at wafer surface 32 is imaged by collection optics 40 onto photodetector 80 as image field IF.

Figure 6:
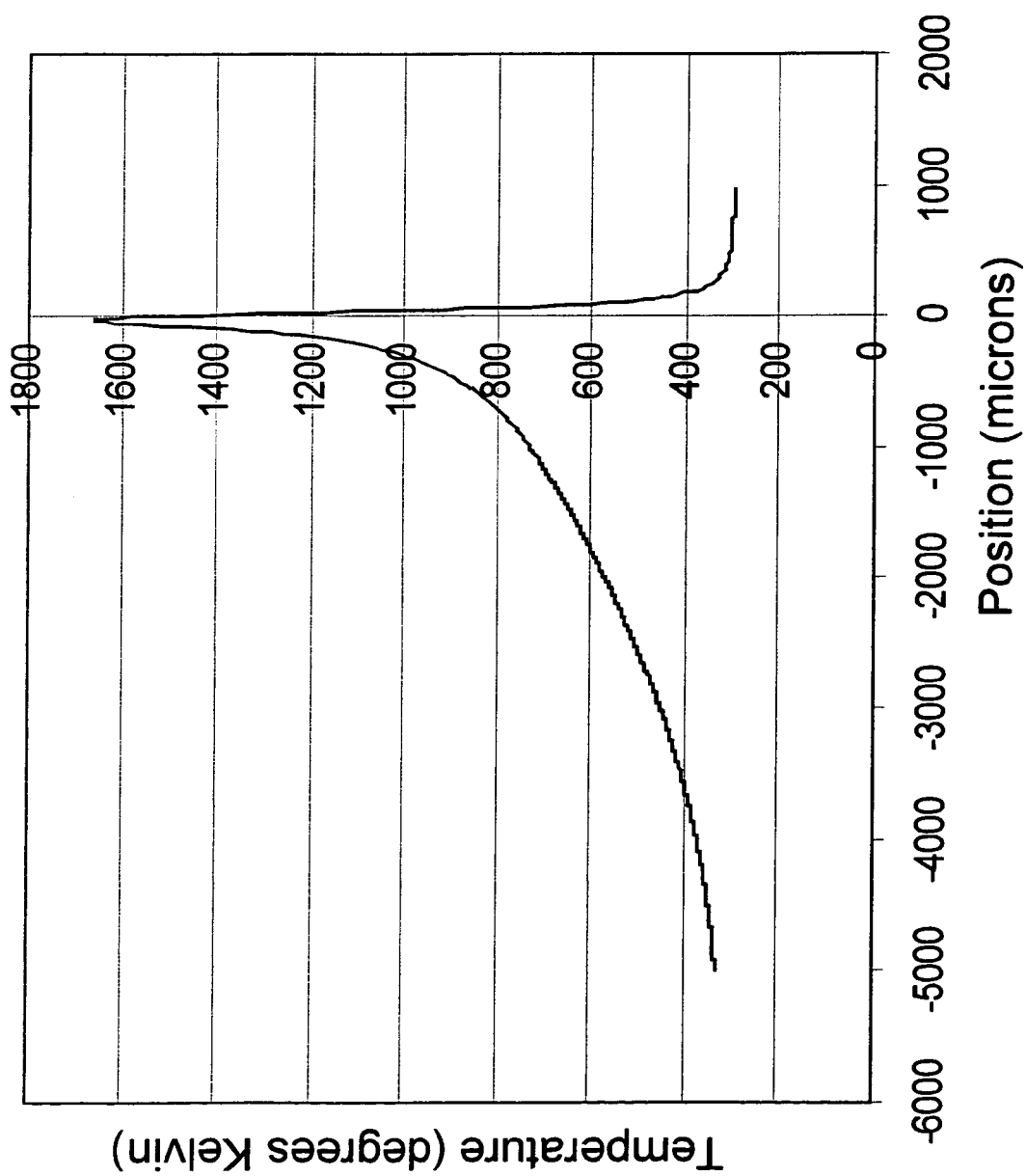
FIG. 6 is a plot from a simulation showing the temperature T (° K) vs. distance (microns) for a point on the surface of a silicon substrate scanned at 500 mm/s through a 0.1 mm wide line image having a Gaussian intensity profile as measured across the width of the image.

FIG. 6 is a plot of a computer simulation showing the temperature T (° K) versus position (microns) of a point on the surface of a silicon substrate relative to a scanned line image 24. In the simulation, the substrate (wafer) 32 was scanned at 500 mm/s through a 0.1 mm wide line image 24 with a Gaussian intensity profile. This scan speed generates a dwell time of about 200 micro-seconds and produces a very sharply peaked temperature distribution. In order to sense the peak temperature within 5° C., it is necessary to keep the size of photodetector 80 to about the same width as the temperature distribution over a 5° C. range at the peak temperature, or de-convolve the temperature distribution seen by each detector element (pixel). A 200 micro-second dwell time on a silicon substrate generates a temperature profile where the width of the region within 5° of the peak temperature is about 1-micron wide.

In the direction along the length of line image 24, it is desirable for the detector array of photodetector 80 to span a distance of 10 mm or 20 mm, for example. Accordingly, in an example embodiment, collection optical system 40 can be made anamorphic to accommodate the different magnification requirements for the different axes. In an example embodiment, the entire length of line image 24, which may be 50 mm long, is not imaged. This is because in most cases only the temperature distribution near the center region of the line image is of interest. In the case of thermal processing an IC wafer, the region of interest is where the temperature is close to the maximum temperature, e.g., to within about 95% of the maximum.

Figure 7:
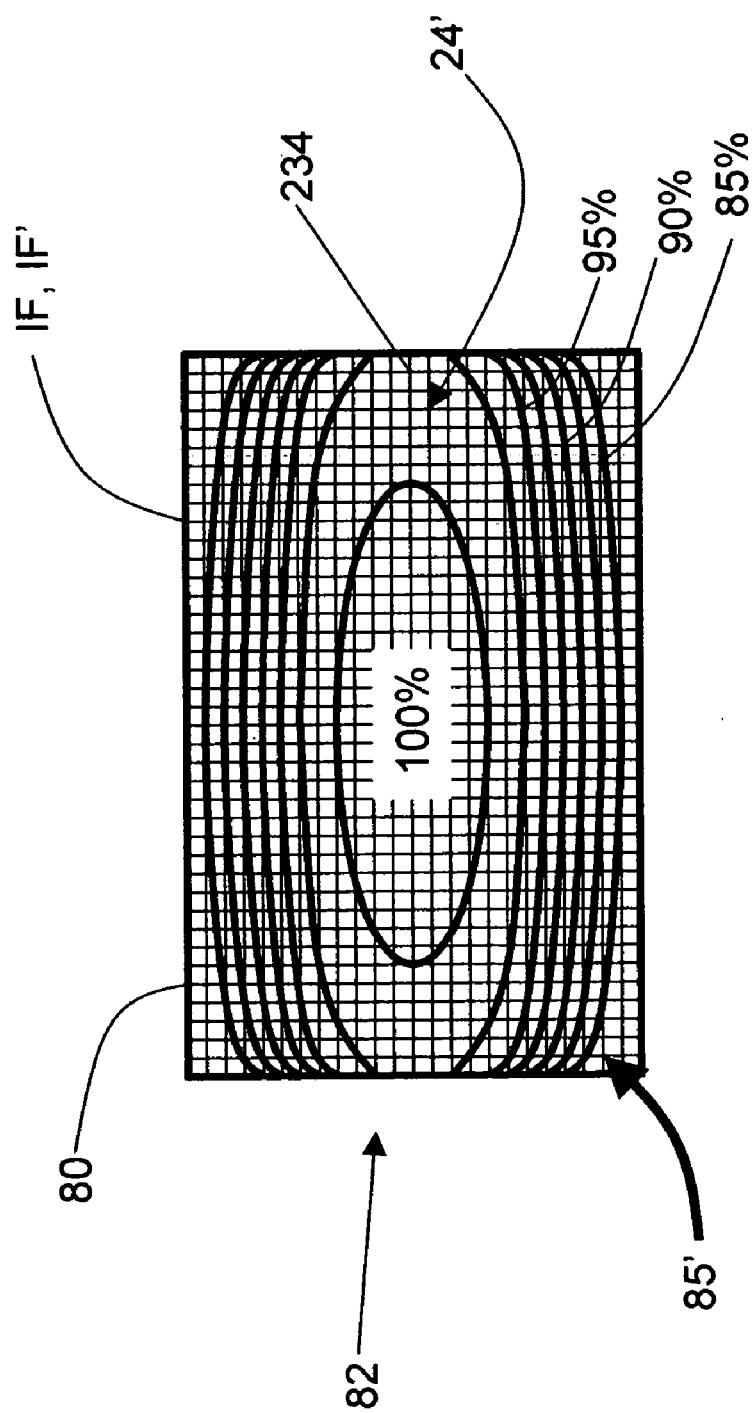
FIG. 7 is a schematic diagram of a plan view of an example embodiment of a photodetector surface that has an array of pixels, and illustrating the imaging of the line image (represented as intensity contours) from the object field onto the photodetector as an image field (IF) from the collection optical system only, or as an enhanced image field (IF') when both the collection and retro optical systems are used.

FIG. 7 is a schematic diagram of a plan view of an example embodiment of photodetector surface 82 that has an array of pixels 234, as would be the case where the photodetector is a silicon CCD array, a silicon CMOS array, an InGaAs photodetector array or a micro-bolometer photodetector array. In an example embodiment, object field OF (e.g., the object field shown in FIG. 3) is imaged onto photodetector surface 82 as a corresponding image field IF that includes an image 24' of line image 24 (FIGS. 1 and 2) represented by intensity contours 85'. Photodetector 80 generates an electrical signal SA (FIG. 2) in response to image field IF being imaged onto the photodetector. Photodetector 80 then sends electrical signal SA to controller 90 for processing. Note that for an arrayed photodetector, signal SA is a collection of signals that includes information for each pixel 234 in the photodetector array (FIG. 3).

Once object field OF has been imaged onto photodetector 80 as image field IF for a time sufficient for photodetector 80 to respond and generate signal SA (e.g., ~0.1 millisecond), controller 90 sends a signal S2 to shutter 120 that "unblocks" (opens) the shutter. This allows optical radiation 160 emitted from the portion of wafer surface 32 covered by object field OFR to enter retro optical system 100. The radiation collected by retro optical system 100 is imaged onto polarization-preserving retroreflecting mirror 110. Retroreflecting mirror 110 retro-reflects the radiation back through collection lens 104, which then images the radiation back onto object field OFR. The retro-reflecting system is designed to preserve the polarization direction of the P-polarization radiation passing through it. The retro-reflected radiation 160 then reflects off of object field OFR and into collection optical system 40. This radiation is combined with radiation 160 that is emitted directly by wafer surface 32 and collected by collection optical system 40, which then images the combined radiation beams 160 onto photodetector 80 as an enhanced image field IF'. The combined beams pass through a common filter and P-polarizer. Photodetector 80 converts the information from enhanced image field IF' into electrical signals SB, which are then sent to controller 90 for processing. Thus, the signal from the photodetector 80 can be considered to alternate between a first level (signal SA) that is just P-polarized radiation emitted directly from the substrate and a second level (signal SB) that includes both directly emitted P-polarized radiation and P-polarized radiation collected and recycled by retro optical system 100 and provided to collection optical system 40. Ideally the time taken to switch between signals SA and SB should be small in comparison to the dwell time.

It is worth noting that the radiation 160 collected by retro optical system 100 and provided to collection optical system 40 via reflection from wafer surface 32 will likely vary from point to point across the substrate. For a substrate such as an IC product wafer, surface 32 includes micro-structures such as gates, polysilicon pads, etc. ranging in size from several microns to about 0.25 micron or less. It is necessary to avoid diffraction and scattering effects caused by such substrate micro-structures and instead achieve specular reflection of recycled radiation so that it is efficiently transferred to collection optical system 40.

This can be accomplished in the present invention by keeping the wavelength of collected radiation 160 large relative to the micro-structure detail on or within surface 32. For similar reasons, it is desirable to keep the angle of incidence θ as large as possible, since this reduces the path difference between rays reflected from high and low micro-structures. The 10.6-micron wavelength chosen for the LTP example embodiment, and the ~75° incident angle that corresponds to the (effective) Brewster angle meet these criteria for thermal processing conditions. However this wavelength is not always conveniently used for temperature measurement. An alternative is to use a photodetector 80 in the form of an InGaAs photodetector array operating in the 1.6 micron region. This wavelength is still large compared to many of the structures likely to be found on a typical wafer prior to a thermal annealing cycle. An incident angle of about 75° further effectively increases the effective wavelength by a factor equal to) 1/cos (75°=3.86. Accordingly, diffraction and scattering of recycled radiation from the micro-structures in a typical IC wafer is insubstantial.

The maximum surface temperature as a function of the length of image 24 is of interest when thermal processing a substrate. In an example embodiment, the maximum surface temperate is probably contained in a few rows of photodetector pixels 234. Thus, the interrogation speed can be increased into the kilohertz range while interrogating only the few pixel rows containing the maximum temperature to achieve high-speed, closed-loop control of the surface temperature.

Once the enhanced image field IF' has been provided to photodetector 80 for a time sufficient to generate signal SB, controller 90 again sends another signal S1 that blocks the optical path through shutter 120. Again, optical radiation emitted from wafer surface 32 is blocked from entering or leaving retro optical system 100, and another signal SA is produced by photodetector 80 and sent to controller 90. This is followed again by unblocking the path through shutter 120 and generating another signal SB from imaging the enhanced image field IF' onto photodetector 80. The above-described process of generating measurement signals SA and SB is repeated at a desired frequency, e.g., 10 kHz, corresponding to a desired time sampling interval for measuring the surface temperature TS.

Determining Surface Temperature Ts from Signals SA and SB

Signals SA and SB are provided to and are processed by controller 90 to yield a surface temperature measurement TS that takes into account the point-to-point variation in the surface emissivity $\xi$. An example embodiment of a method for determining the surface temperature TS from signals SA and SB is now described.

The signal SA is a function of the temperature T and the emissivity $\xi$, i.e., $$SA = \xi f(T) \quad (3)$$

The exact relationship between the surface temperature TS and the signal SA is best established through a calibration procedure using a calibration source that closely approximates a black body with unity emissivity ($\xi$=1). A typical relationship is shown by the example shown in FIG. 8, which is a plot illustrating how signal SA varies with temperature T (° K) when a black body is measured. If the object being measured is not a black body, then the signal will be less than that associated with a blackbody by an amount proportional to $\xi$. Thus, if $\xi$ can be calculated, then the signal equivalent to what would have been obtained from a black body can be obtained by dividing the measured signal by $\xi$ to obtain an equivalent black body signal. The equivalent black body signal can then used with the black body calibration curve of FIG. 8 to determine the temperature. Thus, the calculation of $\xi$ permits a signal level to be calculated that can be referenced on a calibration curve such as that shown in FIG. 8 to establish the surface temperature.

The signal SA is proportional to the product of the surface emissivity $\xi$ and a function f(T) that represents what the signal SA would be if the emission surface were a perfect black body, taking into account the polarizer efficiency (P-polarization), the photodetector response as a function of wavelength, the transmission of collection optical system 40, and the spectral bandwidth of filter 62.

In an example embodiment, the relationship between the surface temperature TS and the signal SA is determined using a black body having a controllable temperature that can be accurately measured with a thermocouple or a thermistor. There are commercially available black bodies that can be used for this purpose. A very good approximation to a black body can be achieved using an undoped, unpatterned silicon wafer that is heated by a hot plate or similar device. The silicon wafer approximates the ideal black body when the P-polarized radiation emitted by the wafer surface is measured by system 20 at an angle near the Brewster angle.

Figure 9:
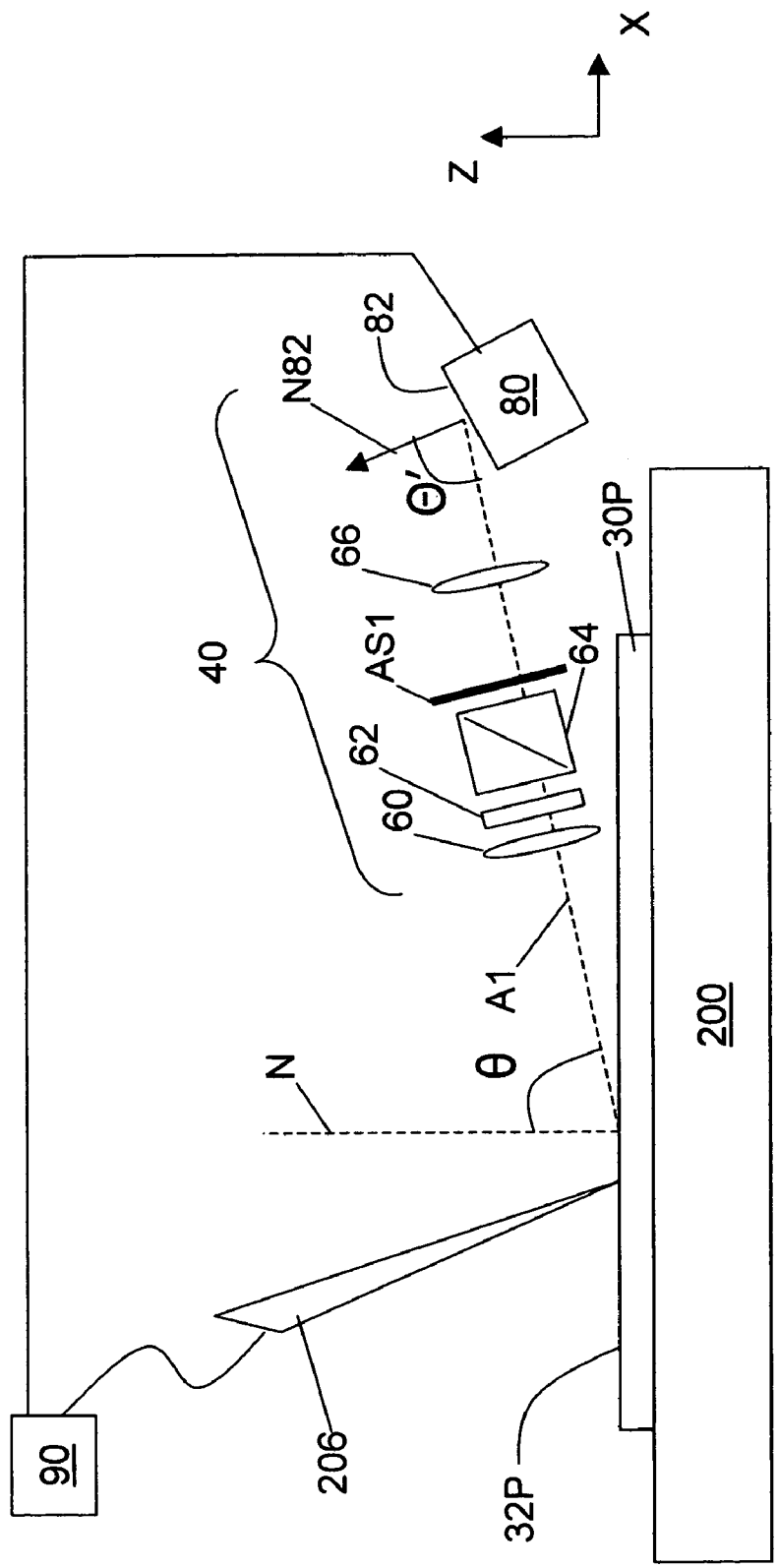
FIG. 9 is a side view of the collection optical system in optical communication with a pure silicon calibration wafer that resides atop a variable-temperature hot plate, along with a thermocouple to provide an accurate temperature measurement of the wafer surface, wherein the pure silicon wafer is used as a blackbody.

FIG. 9 is a side view of collection optical system 40 in optical communication with a pure, unpatterned silicon wafer 30P with a surface 32P. Wafer 30P resides atop a variable-temperature hot plate 200. A thermocouple 206 connected to a controller, such as controller 90, is used to convert thermocouple voltage into a surface temperature TS of wafer surface 32P. The apparatus of FIG. 9 is used to establish the relationship between signal SA and the substrate temperature by using the undoped silicon wafer 30P as a calibration substrate that closely approximates a black body.

Figure 8:
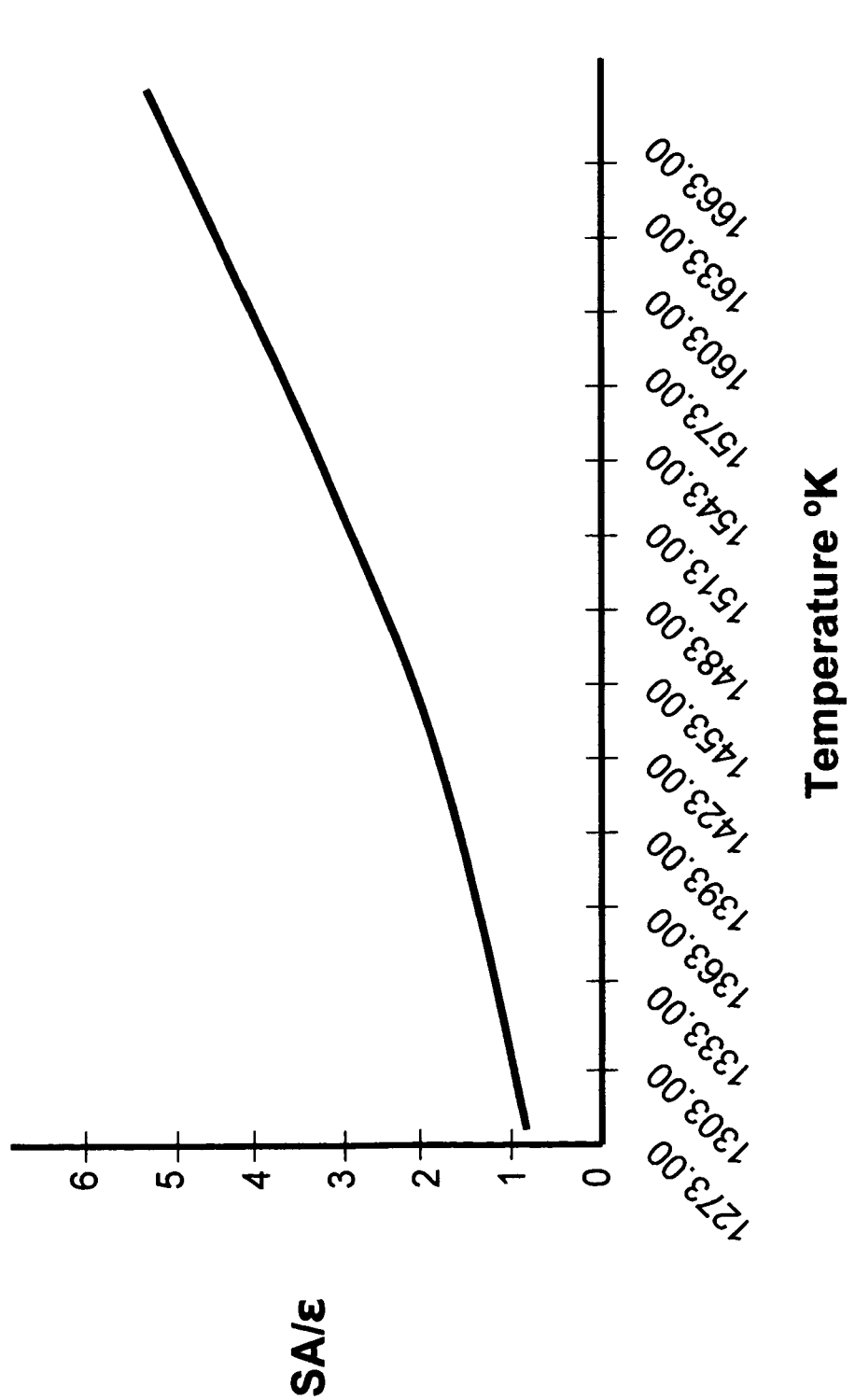
FIG. 8 is a plot of a calibration curve that compares the detector signal SA, from a black body (for a blackbody, $\xi=1$), or the signal ratio SA/$\xi$, for a gray body, vs. the absolute temperature (° K) of the substrate being measured.

For a black body substrate, signals SA and SB are equal because there is no reflection from the black body substrate under the assumed conditions. The resultant relationship is shown by the curve of FIG. 8, which shows the signal SA divided by the emissivity $\xi$ as a function of the absolute substrate temperature in degrees K. The vertical scale is arbitrary and depends on many parameters, including the electronic gain in the photo-detection circuits (not shown) associated with photodetector 80.

When the object being measured has an emissivity different from unity, signal SB will be larger than signal SA, and will differ in magnitude by an amount corresponding to the additional amount of radiation 160 collected by retro optical system 100 and recycled by reflection from the substrate to collection optical system 40. If the round-trip transmission of retro optical system 100 is $t_2$, then using equation (1) for the substrate reflectivity yields the expression:

$$SB = \xi f(T)(1 + t_2(1-\xi)) \quad (4)$$

If signal SB is equal to signal SA then there is no reflected component and the substrate must be a perfect black body.

On the other hand, if the surface being measured is not a black body, then equations (3) and (4) can be employed to solve for the emissivity ξ yielding:

$$\xi = (1/t_2)(1 + t_2 - SB/SA) \quad (5)$$

Thus having solved for ξ and having measured the signal SA, the calibration curve represented by equation (3) is used to find the substrate surface temperature TS. For example, if the emissivity ξ is calculated to be 0.5 and signal SA is measured as 1.0, then the ratio SA/ξ=1/0.5=2. This is the signal level that we would have obtained from a black body at the same temperature. Referring now to the plot of FIG. 8 the temperature that corresponds to a black body signal of 2 is about 1446.5° K. or 1173.5° C.

Figure 10:
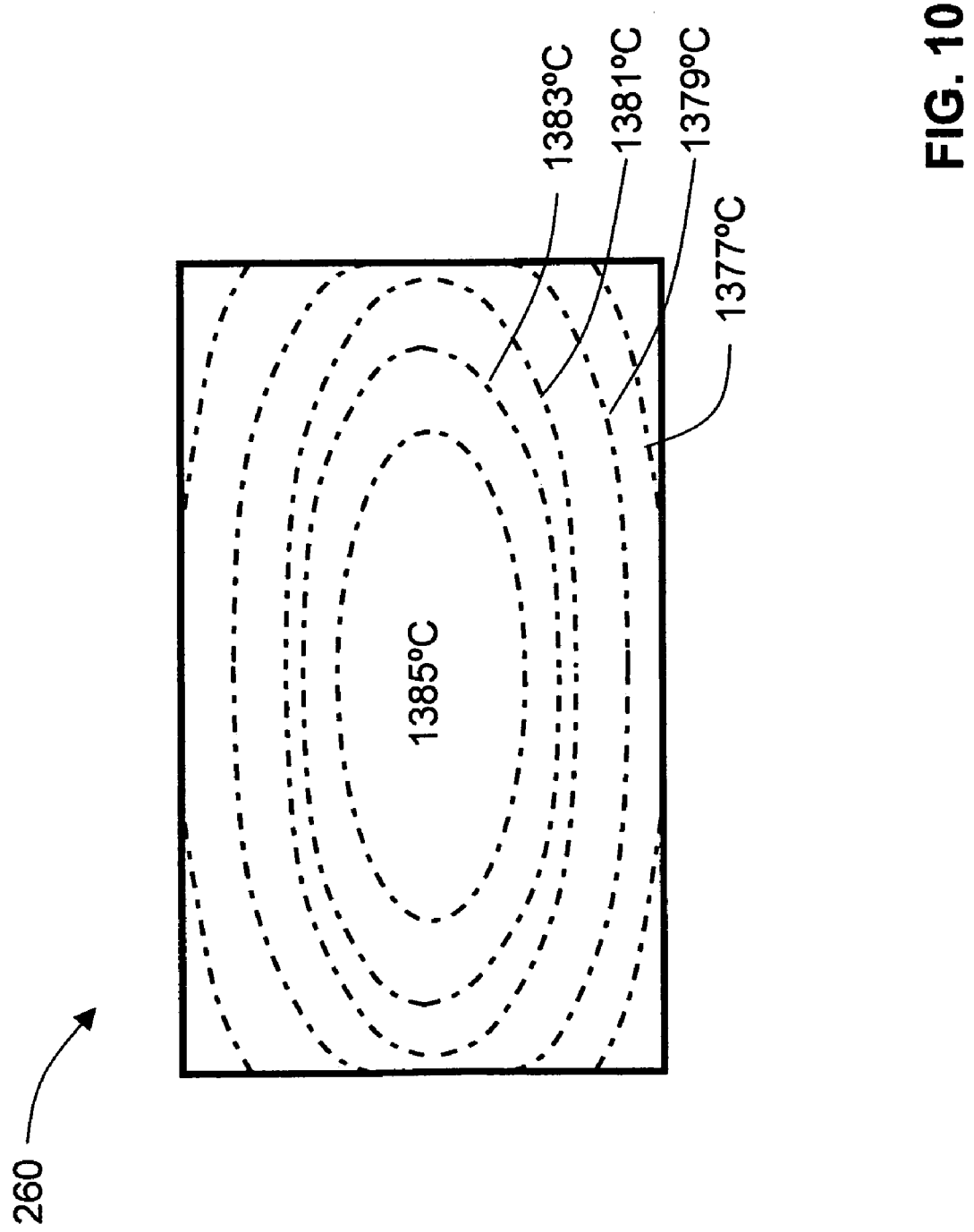
FIG. 10 is a schematic diagram of an example surface temperature contour map that can be created by the controller when the photodetector is or includes a two-dimensional photodetector array.

Thus, the surface emissivity ξ can be accurately determined from measurement of the ratio of signals SA and SB, and the knowledge of the transmission $t_2$ of the retro optical system 100. Transmission $t_2$ is accurately measurable using conventional optical calibration techniques, including those explained below. If photodetector 80 is in the form of a detector array and is used to measure SA and SB, then a temperature map corresponding to the position of each photodetector element (i.e., pixel 234) in the array can be derived. FIG. 10 is a schematic diagram of a surface temperature contour map 260 that can be created by controller 90 when photodetector 80 is a detector array. The maximum surface temperature TS of the substrate as function of the distance along the length of line image 24 can be deduced from the temperature map. Similarly, the uniformity of the maximum surface temperature TS over some length on the substrate surface can be estimated. In an example embodiment, this information is used to determine the spacing between adjacent scans over the substrate and the position of the scan with respect to the substrate. Uniformity information can also be used to derive "go/no-go" criterion for continuing the processing operation.

Any difference between a desired surface temperature TD and the measured maximum surface temperature TM can be used to adjust the power provided to the wafer, as discussed in greater detail below.

Determining TS as a Function of SA, ξ and Transmission $t_2$

Figure 11:
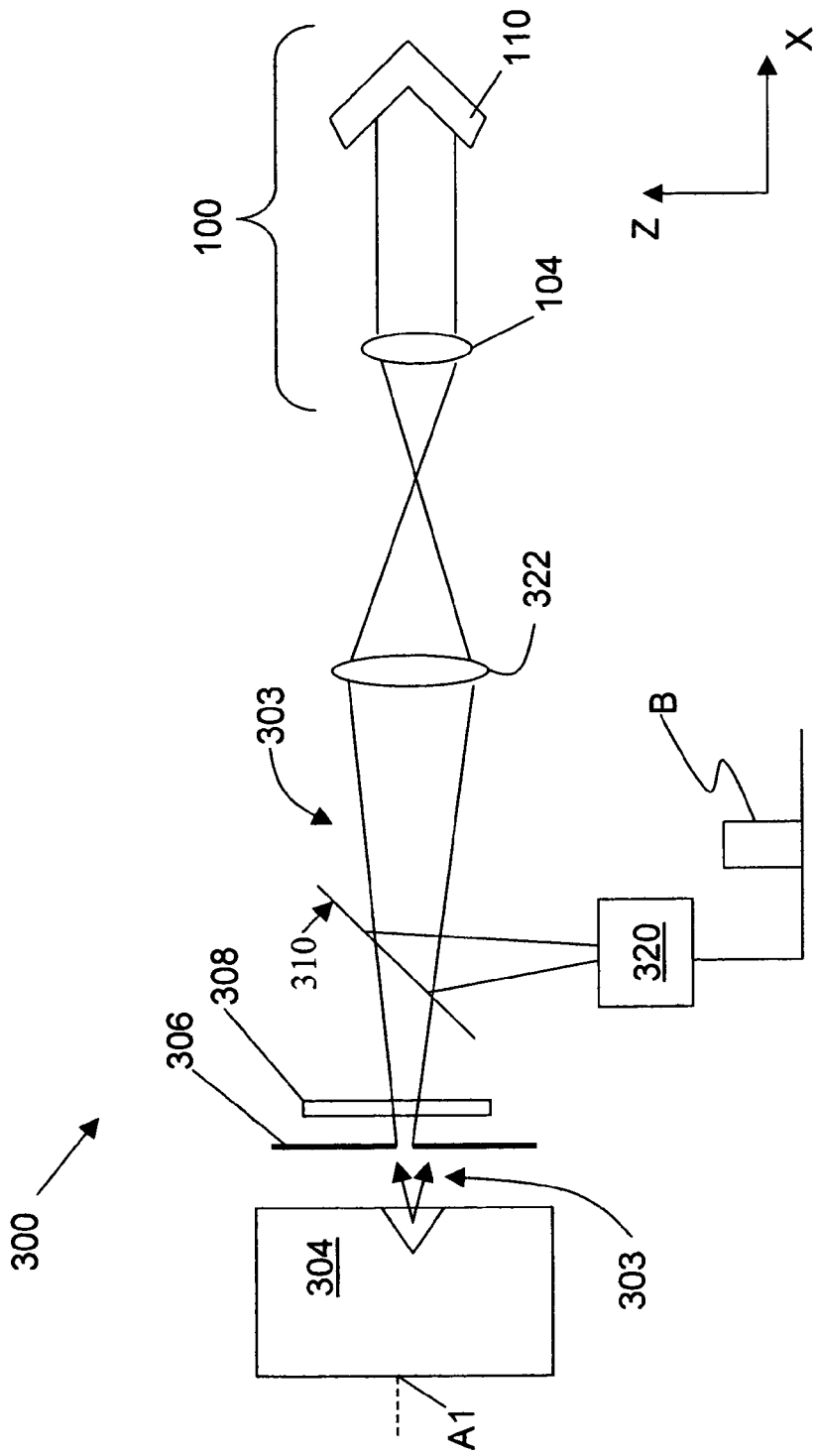
FIG. 11 is a schematic side view of an apparatus for measuring the transmission of the retro optical system.

The round trip transmission $t_2$ of retro optical system 100 can be measured in several different ways. FIG. 11 is a schematic diagram of a calibration apparatus 300 for measuring the transmission $t_2$ of retro optical system 100. Apparatus 300 includes a blackbody 304 arranged along the optical axis A1 of retro optical system 100. An aperture 306 and a wavelength filter 308 are located adjacent blackbody 304. A beamsplitter 310 is arranged down stream of wavelength filter 308 and is oriented to deflect a known portion of the radiation collected by and then leaving the retro optical system 100 to a photodetector 320. A collection lens 322 arranged between beamsplitter 310 and retro optical system 100 facilitates the transfer of filtered radiation 303 to and from the retro optical system. The measured filtered radiation 303 at photodetector 320 that travels twice through retro optical system 100 produces a signal B that depends directly on the round trip transmission $t_2$ of the retro optical system. This can be expressed as:

$$B = k t_2 \quad (6)$$

Figure 12:
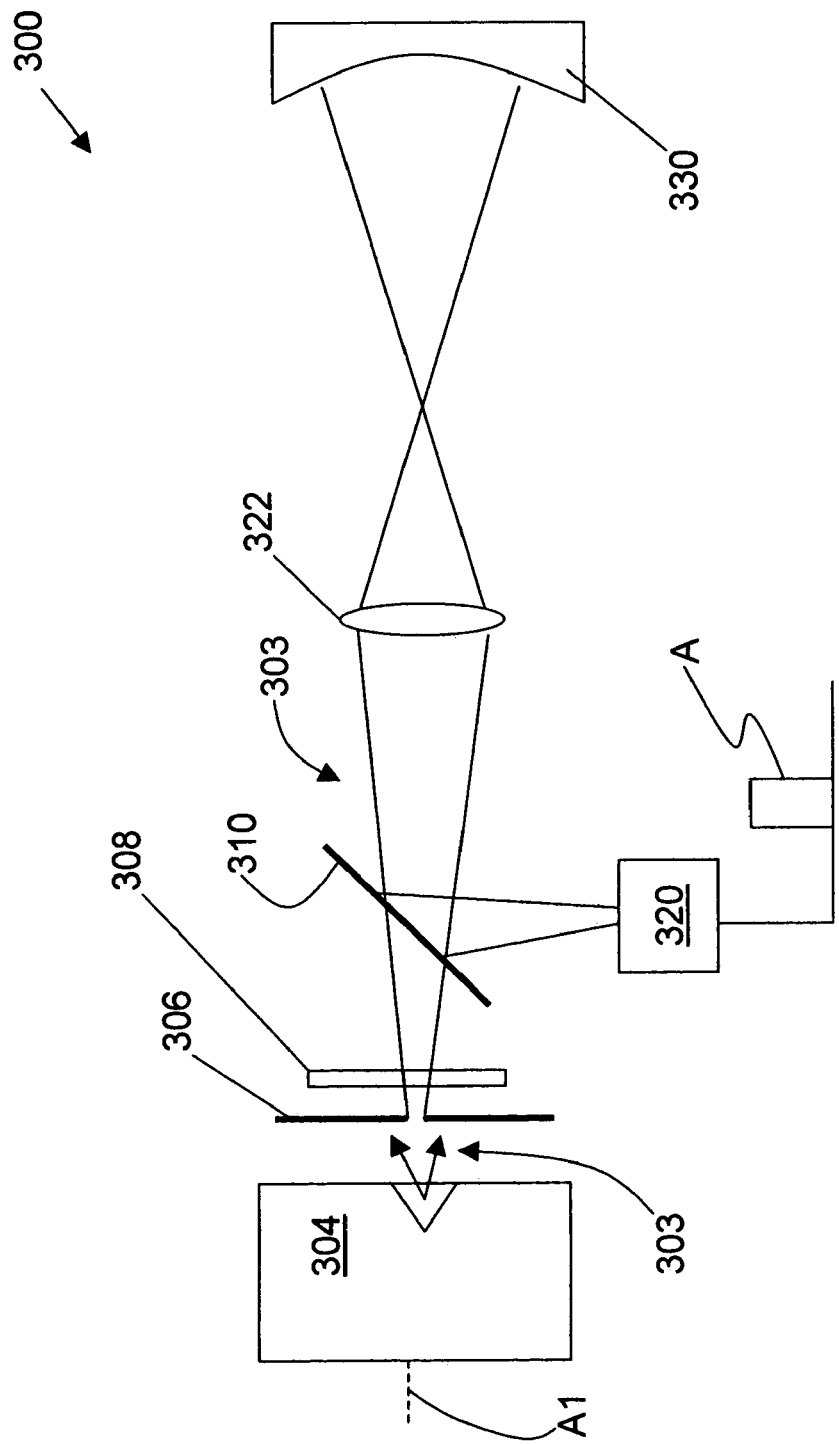
FIG. 12 is the same as FIG. 11, except that the retro optical system is replaced by a concave mirror having a known reflectivity.

FIG. 12 is similar to FIG. 11, except that retro optical system 100 is replaced with a concave mirror 330 having a known reflectivity $R_{330}$. The measured filtered radiation at photodetector 320 that passes twice through retro optical system 100 produces a signal A that depends directly on the reflectivity $R_{330}$ of the mirror. This can be expressed as:

$$A = k R_{330} \quad (7)$$

Solving equations (6) and (7) for $t_2$ after eliminating the proportionality constant k yields:

$$t_2 = B R_{330}/A \quad (8)$$

Alternate Method for Determining Transmission t2

Figure 13:
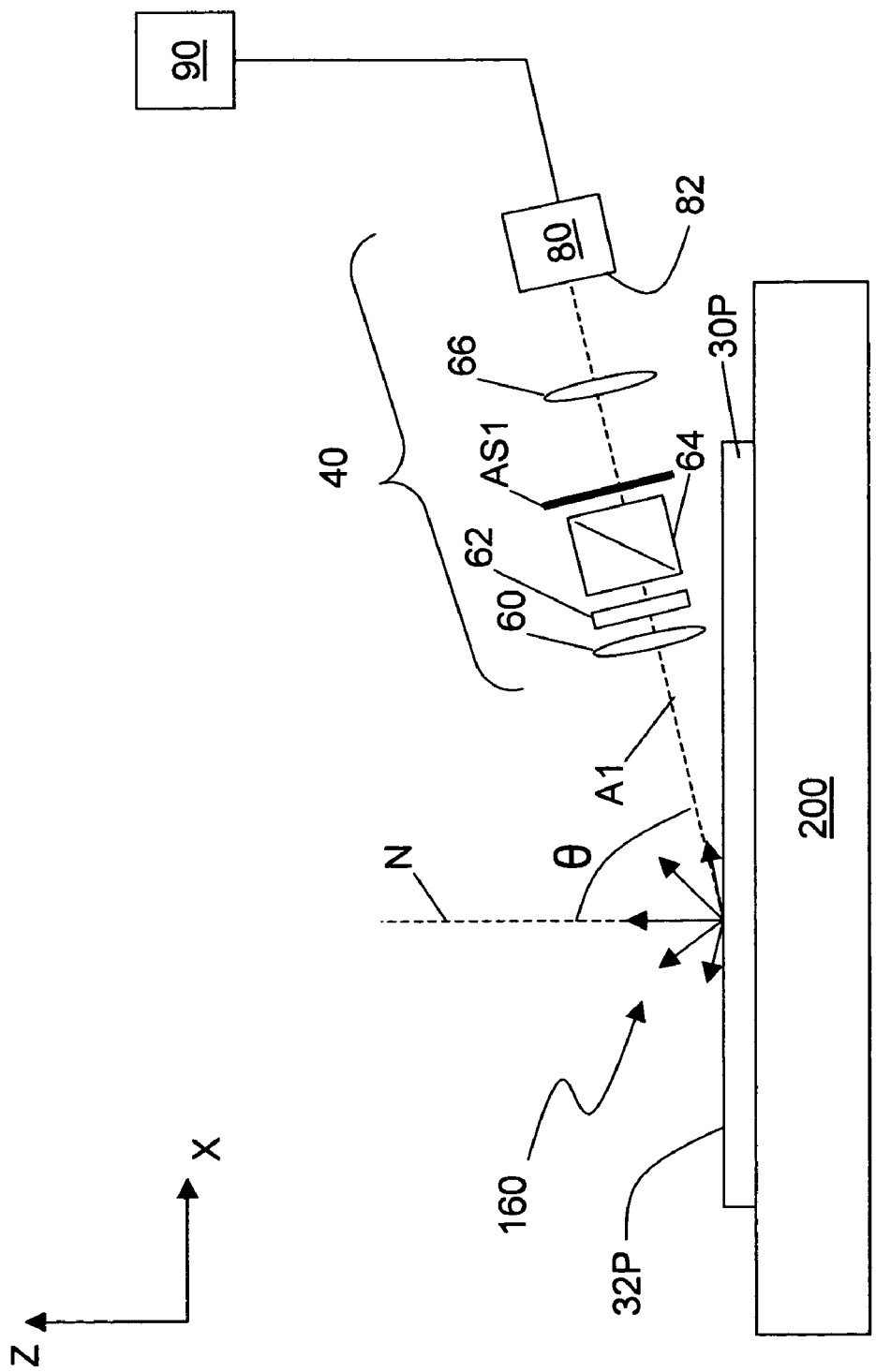
FIG. 13 is a schematic side view of an apparatus similar to that of FIG. 9, as used in an alternative method for measuring the transmission of the retro optical system by first measuring the emissivity of a pure silicon wafer (30P), which approximates a black body, by using only the collection optical system.
Figure 14:
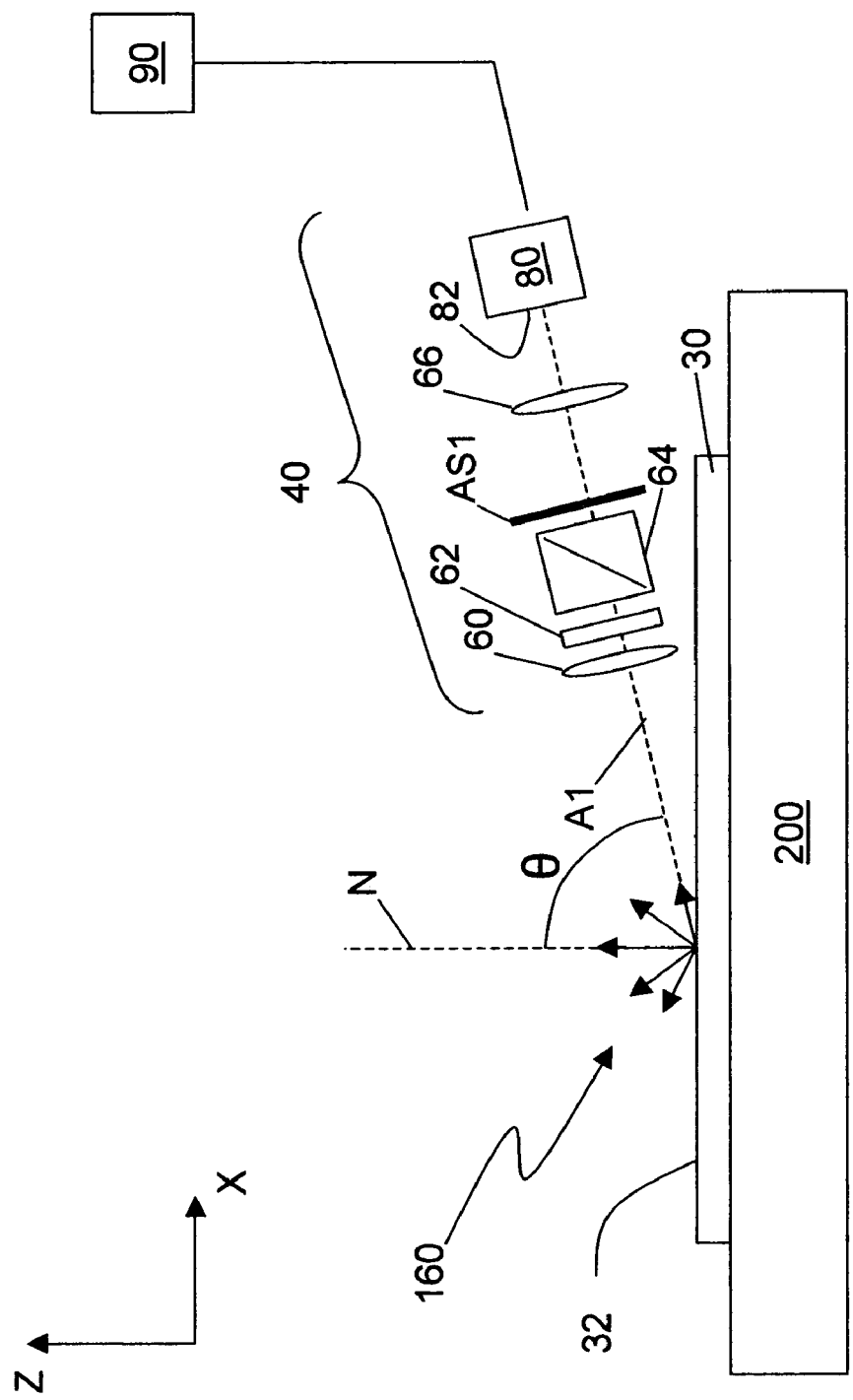
FIG. 14 is the apparatus of FIG. 13, but with a doped or a coated silicon wafer (30) having an emissivity, $\xi$, appreciably different from 1, replacing the pure silicon calibration wafer.
Figure 15:
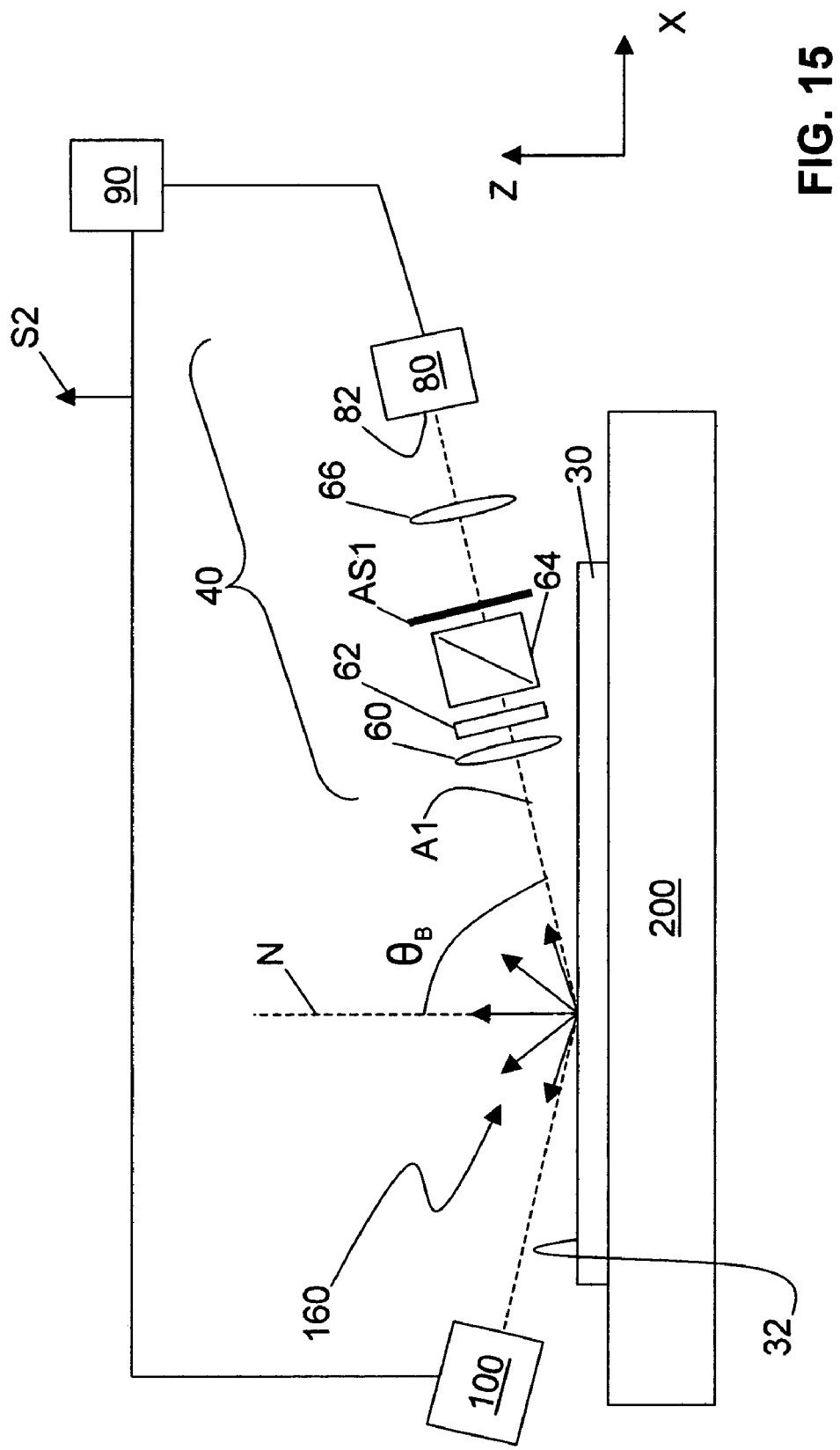
FIG. 15 is the apparatus of FIG. 14, with the retro optical system engaged to collect light from the doped or coated wafer and recycle it to the collection optical system.

An alternate method of estimating the round trip transmission $t_2$ of the retro system 100 is illustrated in FIGS. 13, 14 and 15. FIG. 13 is a schematic diagram similar to FIG. 9, shown measuring an undoped (pure) silicon wafer 30P that resides atop variable hot plate 200. FIG. 14 is the same as FIG. 13, that shows system 40 measuring a coated and/or doped silicon wafer 30 having an emissivity ξ<<1. FIG. 15 is the same as FIG. 14, with retro optical system 100 shown because it is unblocked and contributes to the measurement.

In the present method, three separate measurements are made, all at the same temperature. With reference to FIG. 13 the first measurement is made on the radiation 160 emitted from pure (i.e., undoped) silicon wafer 30P at angles close to the Brewster angle $\theta_B$. This signal (a) closely approximates the signal from a black body. An even closer approximation to a black body can be made by employing the retro-optical system with this measurement. With reference to FIG. 15, the second measurement is made on a coated wafer 30 known to have an emissivity ξ substantially different from unity, and generates a signal (b). The retro optical system 100 is either not employed or is blocked via shutter 120 and so is not shown in FIG. 14 for the sake of illustration. The ratio of signals b and a, (b/a) is the emissivity of the coated wafer. With reference to FIG. 15, the third measurement is the same as the second except that retro optical system 100 is employed, thereby allowing for a measurement (c) to be made, wherein the amplitude of signal c is enhanced relative to signal b due to the addition of the recycled radiation to collection optical system 40, as described above.

The transmission $t_2$ of retro system 100 is calculated via the relation:

$$t_2 = (SB/SA - 1)/(1 - \xi) = (c/b - 1)/(1 - b/a) \quad (9)$$

Controlling the Radiation Source Power

The surface temperature measurement system of the present invention allows for the power in radiation beam RB (FIG. 1) to be adjusted in real time via temperature control feedback to radiation source L to achieve a constant processing temperature. In an example embodiment, this is accomplished by controller 90 sending a control signal SC to radiation source L in LTP optical system 22 to control the output power of the radiation source. The control signal SC is generated in response to the difference between the measured maximum surface temperature $TS_M$ and a desired maximum surface temperature $TS_D$ as determined by controller 90.

This type of temperature control feedback eliminates concerns about the temperature uniformity of the wafer surface immediately prior to thermal processing the wafer. It also compensates for variations in the intensity of LTP radiation beam RB that can be caused by changes in radiation source L, such as changes in the laser cavity temperature when the radiation source is a laser, or changes in the transmission efficiency of the beam-forming optics 23 arranged between the radiation source and the wafer.

Similarly, temperature control feedback compensates for variations in reflectivity of wafer surface 32 caused by the uneven distribution of thin-film stacks (not shown) formed over the wafer surface for an IC wafer. Since a typical wafer scan velocity is, for example, about 125 mm/second, a temperature measurement bandwidth of about 250 Hz would allow temperature variations occurring over a millimeter of scan path to be compensated via temperature control feedback. An even higher bandwidth would be desirable so that changes in reflectivity caused by differences over the wafer surface (e.g., due to micro-structure and other circuit patterns) can be accommodated. Accommodating changes over a time span that is small compared to the dwell time of the annealing beam might require a temperature control bandwidth well in excess of 1 kHz.

Alternate System Configuration

Figure 16:
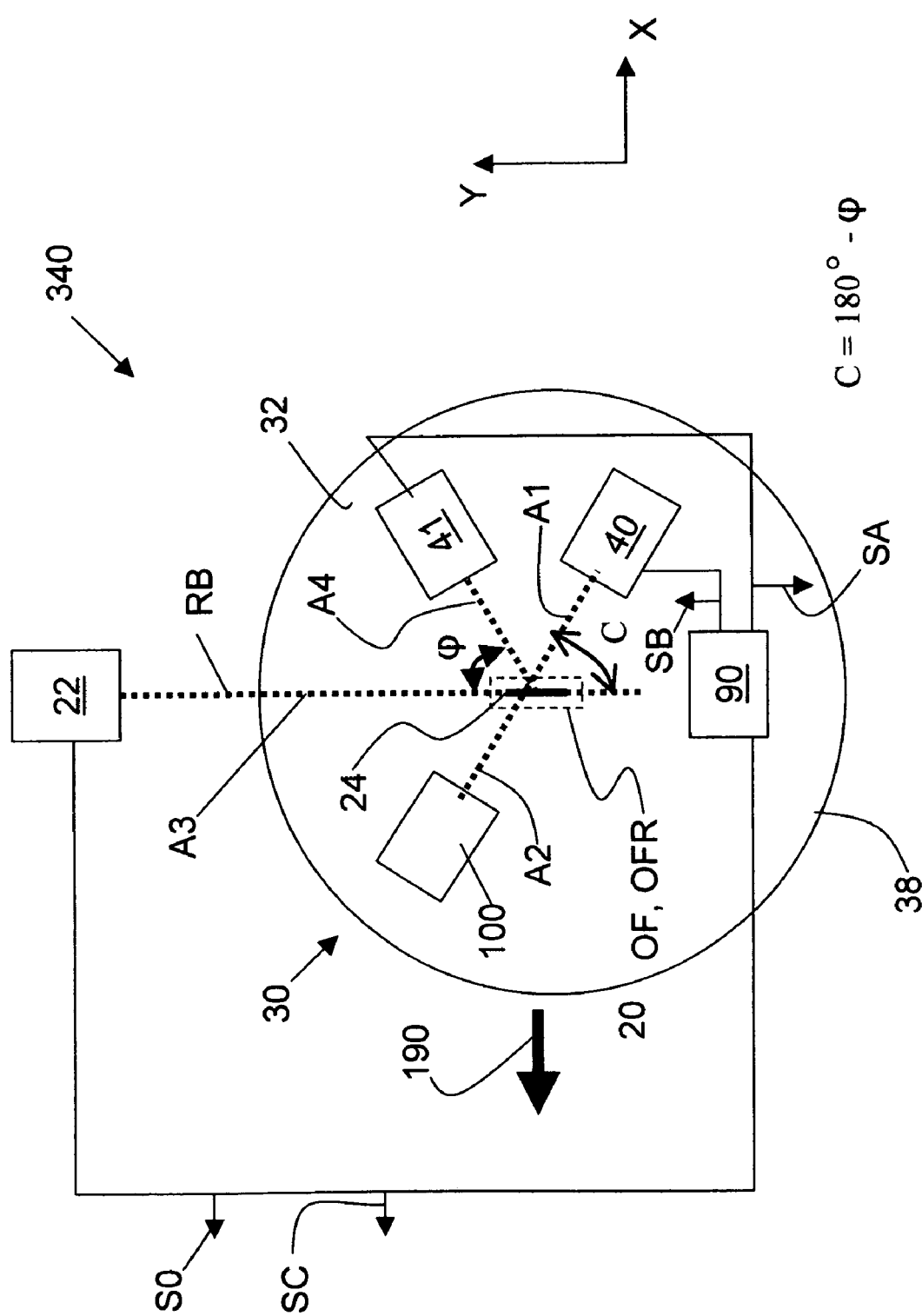
FIG. 16 is a plan view of an alternative embodiment of the surface-temperature measurement system of FIG. 1, wherein the alternative embodiment includes two collection optical systems arranged at different azimuthal angles, wherein only one of the collection optical systems is optically coupled to a retro optical system.

FIG. 16 is a plan view similar to that of FIG. 1, illustrating a surface-temperature measurement system 340 as an alternate example embodiment to system 20 of FIG. 1. System 340 includes system 20 minus shutter 120 in the retro optical system 100. System 340 further includes a second collection optical system 41 arranged along an optical axis A4 that is at an azimuthal angle $\phi$ relative to optical axis A3 of the annealing radiation source. In an example embodiment, collection optical system 41 is identical to collection optical system 40. A preferred embodiment is to place system 41 at an azimuth angle $\phi$ relative to radiation beam RB and collection optical system 40 at an angle C ($180°-\phi$) to the radiation beam. This results in an equal amount of image foreshortening in systems 40 and 41 because of the non-normal angle between their axis axes A1 and A4 and the LTP radiation beam axis A3.

In operation, system 340 collects emitted radiation 160 (FIG. 2) over object field OF directly via first collection optical system 40, and indirectly via retro optical system 100 from reflection of recycled radiation from the substrate to first optical system 40, as described above. System 340 then detects this radiation with photodetector 80 (FIG. 2) and generates therefrom a measurement signal SB in the manner described above. Measurement signal SB is then provided to controller 90.

Simultaneously with the collection of radiation 160 by system 40, second collection optical system 41 also collects radiation 160 emitted from the same object field OF. Second collection optical system 41 then forms measurement signal SA in the same manner as described above in connection with system 20 of FIG. 1 when shutter 120 blocks the optical path Of recycling optical system 100. Measurement signal SA is then provided to controller 90. Since the measurement channels used to obtain signals SA and SB are different, it is necessary to ensure that their responses are set equal, i.e. that the proportionality between the radiation flux input to the signal generated is the same in both cases. It is also necessary to ensure that only P-polarized radiation is measured and that the retro optical system does not rotate the polarization direction of the recycled radiation.

Controller 90 then processes measurement signals SA and SB in the manner described above. The benefit of surface temperature measurement system 340 is that measurement signals SA and SB can be generated simultaneously rather than sequentially using only system 20 with shutter 120. Further, the simultaneous measurements ensure that radiation 160 was collected from the same region of the wafer surface. Simultaneous signal generation doubles the maximum frequency response and helps to assure that the signals SA and SB come from exactly the same portion of the substrate. However since the signals SA and SB come from through different optical systems, filters, polarizers and photodetectors it is necessary to ensure that their sensitivities are identical. This can be done by employing matched components such as filters, polarizers, etc. and by blocking the operation of the retro system, calibrating both systems with the same black body and adjusting their relative gains until they are exactly equal.

In an example embodiment, the two measurements represented by signals SA and SB obtained with system 340 are made with identical photodetectors over identical areas (object fields), identical angles of incidence, equal and opposite azimuth angles, as measured either side of the normal to the long direction of the image, identical collection geometries and with identical polarizations.

Radiation Beam Adjustment

It is desirable to have the ability to adjust the radiation beam used to process the substrate so that it produces a uniform maximum temperature over the longest possible portion of the line image. The longer the line image, the higher the throughput; and the more uniform the maximum processing temperature, the more consistent the processing result.

Figure 17:
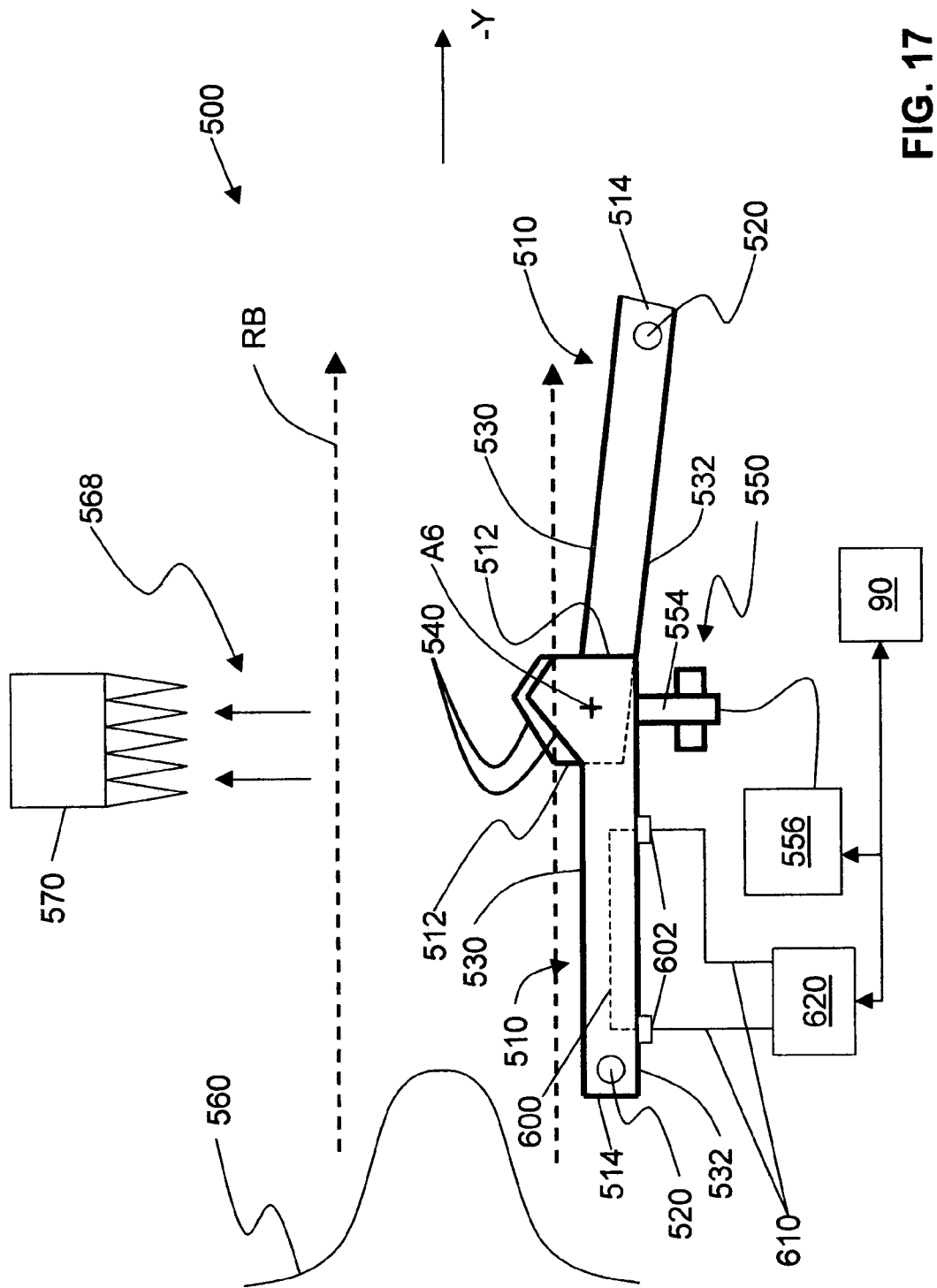
FIG. 17 is a schematic side view of an example embodiment of a beam-adjustment apparatus adapted to selectively adjust the amount of energy in the radiation beam via variable spatial attenuation to improve the maximum temperature uniformity while thermal processing a substrate.

FIG. 17 is a schematic side view of an example embodiment of beam-adjustment apparatus 500 introduced above in connection with beam-forming optics 23 (FIG. 1). The view is in the X-direction (see also FIG. 1). Beam-adjustment apparatus 500 is adjustable to provide a spatially varying attenuation of radiation beam RB.

Beam-adjustment apparatus 500 includes a number of pivot arms 510 each having a proximate end 512 and a distal end 514. Each pivot arm has a pivot point 520 at or near distal end 514. The pivot arms also have an upper surface 530 and a lower surface 532. Each pivot arm includes a mirror segment 540 mounted to or integrally formed with the pivot arm on upper surface 530 at or near proximate end 512. Pivot arms 510 are interleaved so that the proximate ends 512 and mirror segments 540 are all adjacent one another and reside along a central axis A6 when the pivot arms are in a "zero" or rest position. Adjacent pivot arms have their distal ends on opposite sides of axis A6.

Beam-adjustment apparatus 500 also includes a screw adjustment unit 550. Unit 550 has, for each pivot arm 510, an adjustable screw 554 in mechanical contact with the lower surfaces 532 of pivot arm 510 at or near proximate end 512. Adjustable screw 554 is driven by a rotary actuator 556 operably coupled to unit 550. Rotary actuator 556 is in turn operably coupled to controller 90, which in an example embodiment controls the operation of the rotary actuator. The movement of screws 554 in unit 550 raises or lowers the corresponding proximate ends 512 of pivot arms 510, thereby moving mirror segments 540 further into the path of radiation beam RB. Also shown in FIG. 17 is a Gaussian distribution 560 for the cross-sectional beam intensity.

In an example embodiment, deflected radiation 568 from radiation beam RB by each mirror segment 540 inserted into the radiation beam is trapped by a heat dump 570, which is arranged to intercept and absorb the deflected radiation. Also in an example embodiment, mirror segments 540 and pivot arms 510 are integrally formed molybdenum, which can be polished to yield a mirror surface. In a typical application, about 5% of the energy incident on each mirror is absorbed. Thus, in an example embodiment, heat is removed from apparatus 500 either by forced convection or by liquid cooling via cooling conduits 600 and corresponding input/output ports 602 formed in each pivot arm 510 (only one cooled pivot arm is shown for ease of illustration). Cooling lines 610 operably connect input/output ports 602 to a cooling unit 620 that supplies and flows a cooling fluid through the cooling conduit 600. Cooling unit 620 is operably coupled to controller 90, as is screw adjustment unit 550.

Adjustment of radiation beam RB is achieved using the following process:
1) Adjust all mirror segments to their zero position (out of the radiation beam).
2) Measure the distribution of the maximum surface temperature along the length of the beam image using a test wafer.
3) If the temperature distribution is within specification quit, otherwise continue.
4) Find the lowest maximum surface temperature and the corresponding mirror segment. This mirror is not adjusted.
5) Calculate the adjustment for and make the adjustment on all the other mirror segments to provide a maximum temperature equal to the lowest maximum surface temperature.
6) Begin again at 2.

Figure 18:
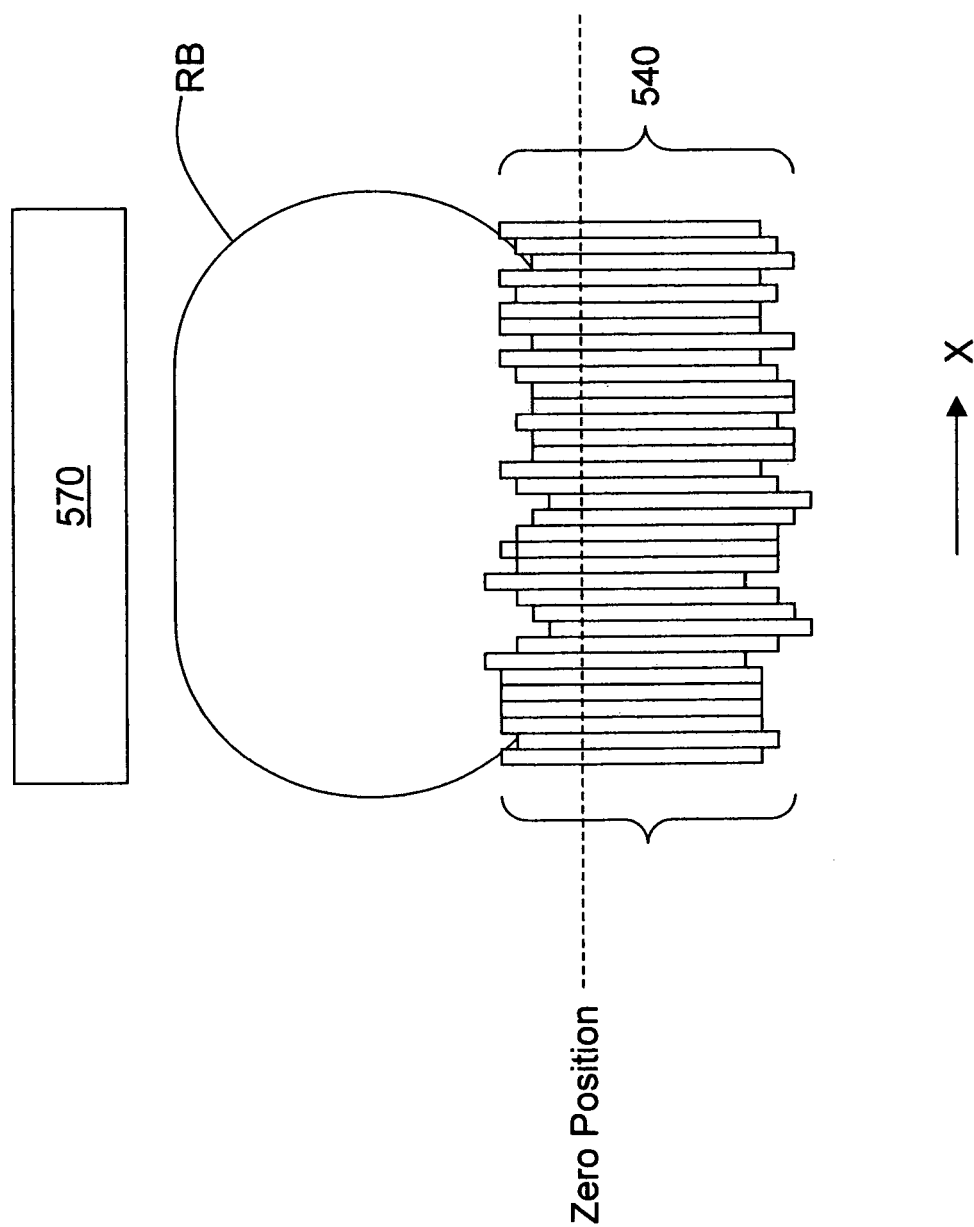
FIG. 18 is a front-on view of the radiation beam illustrating the variable protrusion of each mirror segment into the radiation beam to perform variable spatial attenuation of the radiation beam in order to adjust the amount of power in the beam being delivered to a substrate.

FIG. 18 is a schematic diagram of radiation beam RB along with adjusted mirror segments 540. The view of FIG. 18 is taken in the −Y direction of FIG. 1, i.e., looking along the path of radiation beam RB. Each mirror segment 540 protrudes into the beam by an amount such that the maximum temperature produced by irradiating the substrate with the radiation beam is constant over the length of the line image formed by the radiation beam. The position of each mirror segment 540 is individually adjustable with respect to the radiation beam so that it can intercept a larger or smaller proportion of the energy contained in the wings of the Gaussian-shaped radiation beam. The orientation of the mirror segments is such that each mirror segment affects the energy per unit length at some point along the image profile but not the length of the image profile. There is also a second order effect on the local width of the image profile, which affects the dwell time; but such small changes in dwell time are not important.

Since the profile of radiation beam RB is likely to change slightly with changes in the beam power, it is desirable to adjust the beam uniformity at a power level close to the power level anticipated for the process at hand.

In the foregoing Detailed Description, various features are grouped together in various example embodiments for ease of understanding. The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction and operation described herein. Accordingly, other embodiments are within the scope of the appended claims.

What is claimed is:

1. A system for remotely measuring a temperature of a specular surface of an object having a Brewster angle and an emissivity $\xi$, comprising:
    a collection optical system having a photodetector and arranged to receive and detect P-polarized radiation emitted directly from a first side of a portion of the surface at or near the Brewster angle with said photodetector to form therefrom a first signal SA;
    a P-polarization-preserving retro optical system with a round-trip transmission time of $t_2$ arranged to receive P-polarized radiation emitted from a second side of said portion of the surface at or near the Brewster angle and retro-reflect the second side received P-polarized radiation to said portion of the surface $t_2$ later with said collection optical system receiving a combination of said retro-reflected and emitted directly radiations to cause the photodetector to form a second signal SB; and
    a controller coupled to the photodetector, the controller adapted to receive and process signals SA and SB and calculate the surface emissivity $\xi=1-(SB/SA-1)/t_2$.

2. The system of claim 1, wherein the controller includes calibration data that relates a ratio SA/$\xi$ to surface temperature, and that is adapted to determine the surface temperature from the ratio.

3. The system of claim 2, wherein the photodetector includes an array of pixels that map to the surface portion, and wherein the controller is adapted to calculate a surface temperature corresponding to each pixel to create a surface temperature map of the surface portion.

4. The system according to claim 2, further including:
    a radiation source operably coupled to the controller and adapted to generate a radiation beam to irradiate said portion of the surface to heat the surface; and
    wherein the controller provides a control signal to the radiation source to control an amount of radiation in the radiation beam based on the determined surface temperature.

5. The system of claim 1 wherein said collection optical system has an optical axis A1 and said retro optical system has an optical axis A2 with optical axes A1 and A2 in the same plane.

6. The system of claim 1 wherein each of said collection optical system and said retro optical system each has an object plane and an object field at said portion of the surface with each being substantially the same as each other.

* * * * *